US008265166B2

(12) United States Patent
Raines et al.

(10) Patent No.: US 8,265,166 B2
(45) Date of Patent: *Sep. 11, 2012

(54) DUAL DECODER PORTABLE MEDIA DEVICE

(75) Inventors: Moshe Raines, Tel Aviv (IL); Eliyahou Harari, Saratoga, CA (US); Ran Carmeli, Rinatya (IL)

(73) Assignee: SanDisk IL Ltd., Kfar Saba (IL)

( * ) Notice: Subject to any disclaimer, the term of this patent is extended or adjusted under 35 U.S.C. 154(b) by 1155 days.

This patent is subject to a terminal disclaimer.

(21) Appl. No.: 12/120,256

(22) Filed: May 14, 2008

(65) Prior Publication Data

US 2008/0285660 A1  Nov. 20, 2008

Related U.S. Application Data

(60) Provisional application No. 60/917,680, filed on May 14, 2007.

(51) Int. Cl.
*H04N 7/12* (2006.01)
(52) U.S. Cl. .................................. 375/240.25
(58) Field of Classification Search .............. None
See application file for complete search history.

(56) References Cited

U.S. PATENT DOCUMENTS

| 6,128,015 | A  | * | 10/2000 | Zenda .......................... 345/474 |
| 6,522,419 | B1 |   | 2/2003 | Ko |
| 7,012,610 | B2 |   | 3/2006 | Turner et al. |
| 7,149,811 | B2 | * | 12/2006 | Wise et al. .................. 709/247 |
| 7,446,819 | B2 |   | 11/2008 | Kim et al. |
| 7,451,328 | B2 | * | 11/2008 | Hsieh ........................... 713/300 |
| 7,916,809 | B2 | * | 3/2011 | Tsushima .................... 375/316 |

(Continued)

FOREIGN PATENT DOCUMENTS

EP   1 557 750 A1   7/2005

(Continued)

OTHER PUBLICATIONS

International Preliminary Report on Patentability for International Application No. PCT/IL2008/000667 (Nov. 17, 2009).

(Continued)

*Primary Examiner* — Ayaz Sheikh
*Assistant Examiner* — Faiyazkhan Ghafoerkhan
(74) *Attorney, Agent, or Firm* — Jenkins, Wilson, Taylor & Hunt, P.A.

(57) ABSTRACT

A portable media device 100 including two onboard hardware media decoders (124, 128) operative to decode a given digital content item 148 is provided. In some embodiments, one of the onboard hardware media decoders 128 has a relatively high power consumption and produces a relatively 'high quality' media signal, and the other of the onboard hardware media decoder 124 has a relatively low power consumption and produces a relatively 'low quality' media signal. In one non-limiting use case: (i) when no external power is available, the relatively 'low power' hardware media decoder 124 may generate a relatively 'low quality' media signal which is presented on an onboard display screen 140a and/or onboard speaker 140b; and (ii) when external power is available, the relatively 'high power' hardware media decoder 128 may generate a relatively 'high quality' media signal which is exported out of the portable media device 100 via one or more media ports, and presented on an external host presentation device 160 (for example, a large-screen television).

21 Claims, 17 Drawing Sheets

U.S. PATENT DOCUMENTS

| | | | |
|---|---|---|---|
| 7,957,603 B2* | 6/2011 | Tu et al. ............... 382/233 |
| 2002/0095689 A1* | 7/2002 | Novak ................... 725/86 |
| 2003/0037335 A1* | 2/2003 | Gatto et al. ............. 725/86 |
| 2003/0099293 A1* | 5/2003 | Okada et al. ......... 375/240.13 |
| 2003/0128197 A1 | 7/2003 | Turner et al. |
| 2004/0027312 A1 | 2/2004 | Owada et al. |
| 2004/0160533 A1* | 8/2004 | Oku et al. .............. 348/571 |
| 2004/0258162 A1* | 12/2004 | Gordon et al. ......... 375/240.25 |
| 2005/0163493 A1 | 7/2005 | Kobayashi et al. |
| 2005/0190191 A1 | 9/2005 | Turner et al. |
| 2005/0213833 A1 | 9/2005 | Okada et al. |
| 2005/0227773 A1 | 10/2005 | Lu et al. |
| 2006/0020985 A1 | 1/2006 | Ting |
| 2006/0036885 A1* | 2/2006 | Hsieh ................... 713/300 |
| 2006/0109240 A1 | 5/2006 | Fu et al. |
| 2006/0120462 A1* | 6/2006 | Tsuboi ................ 375/240.25 |
| 2006/0129861 A1* | 6/2006 | Kee et al. ............... 713/323 |
| 2006/0245504 A1 | 11/2006 | Ogikubo et al. |
| 2007/0075127 A1 | 4/2007 | Rosenberg |
| 2007/0150592 A1* | 6/2007 | Bell .................... 709/226 |
| 2007/0153011 A1 | 7/2007 | Wang et al. |
| 2007/0195685 A1 | 8/2007 | Read |
| 2007/0247551 A1 | 10/2007 | Raines |
| 2007/0250193 A1 | 10/2007 | Raines et al. |
| 2007/0263473 A1 | 11/2007 | Raines |
| 2007/0288969 A1 | 12/2007 | Prum |
| 2008/0005424 A1 | 1/2008 | Raines |
| 2008/0018789 A1 | 1/2008 | Lin |
| 2008/0094368 A1 | 4/2008 | Ording et al. |
| 2008/0108392 A1 | 5/2008 | Moon et al. |
| 2008/0111771 A1* | 5/2008 | Miller et al. ............ 345/76 |
| 2008/0128505 A1 | 6/2008 | Challa et al. |
| 2008/0159654 A1* | 7/2008 | Tu et al. ................ 382/298 |
| 2008/0285659 A1 | 11/2008 | Raines et al. |

FOREIGN PATENT DOCUMENTS

| | | | |
|---|---|---|---|
| WO | WO 2005/069614 A1 | 7/2005 |
| WO | WO 2006/125999 A1 | 11/2006 |
| WO | WO 2008/139476 A2 | 11/2008 |

OTHER PUBLICATIONS

Written Opinion of the International Searching Authority for International Application No. PCT/IL2008/000667 (Nov. 14, 2009).
International Search Report for International Application No. PCT/IL2008/000667 (Dec. 22, 2008).
Zoran "Vaddis® 888 DVD Multimedia Processor Product Brief," pp. 1-2 (Dec. 2007).
"VIA CX700M System Media Processor," pp. 1-4 (Publication date unknown).
http://en.wikipedia.org/wiki/Skype.
Notice of Allowance and Fee(s) Due for U.S. Appl. No. 12/120,253 (Mar. 9, 2012).
Interview Summary for U.S. Appl. No. 12/120,253 (Feb. 29, 2012).
Non-Final Official Action for U.S. Appl. No. 12/120,253 (Nov. 8, 2011).

* cited by examiner

Portable Device 100 is Coupled to Host 160

Portable Device 100 is Coupled to Host 160

Portable Device 100 is Coupled to Host 160

Portable Device 100 is Coupled to Host 160

Ordered Sequence of Images

DUAL DECODER PORTABLE MEDIA DEVICE

CROSS-REFERENCE TO RELATED APPLICATIONS

This patent application claims the benefit of U.S. Provisional Patent Application No. 60/917,680 filed May 14, 2007 by the present inventors.

This application is related to U.S. patent application Ser. No. 12/120,253 of the same inventors, which is entitled "METHODS OF OPERATING A DUAL DECODER PORTABLE MEDIA DEVICE" and filed on the same day as the present application. The latter application, also claiming priority from U.S. Provisional Patent Application No. 60/917,680 is incorporated in its entirety as if fully set forth herein.

FIELD OF THE INVENTION

The present invention relates to a portable media device.

BACKGROUND AND RELATED ART

Portable multimedia players are well known in the art and are designed to convert a digital file, stored on a magnetic medium or in flash memory, into streaming video and audio. Typically, portable multimedia players include an onboard screen for presenting the video stream, and at least one of (i) an onboard speaker for 'presenting' the audio stream and/or (ii) an audio media port for exporting the audio stream (for example, to headphones).

One salient feature of portable multimedia players is their relatively low power consumption, which allows users to listen to view movies using power provided by an onboard internal battery. To achieve this low power consumption, portable multimedia players are designed to save as much energy as possible, and their electronics are tightly designed for presenting video on a small display and at relatively low quality. In addition, some portable multimedia players also provide an output plug, which may be plugged into a media input port of a large screen (for example, a television), if available. This enables display of the 'low quality video, which is generated internally within the portable multimedia player, on the large screen.

It would be very much desired and appreciated by electronic entertainment consumers to have a pocket-sized portable media device that is capable of generating and exporting a 'higher quality' media signal to an external screen and/or speaker.

SUMMARY OF EMBODIMENTS OF THE INVENTION

Various embodiments address these and related issues, examples of which embodiments, including methods and systems, are provided herein.

It is now disclosed for the first time a portable media device for decoding a given digital content item. The portable media device comprises: a) a device housing; b) a first onboard hardware media decoder associated with the device housing, the first onboard hardware media decoder operative to decode the given digital content item to generate a first media signal; c) a second onboard hardware media decoder associated with the device housing, the second onboard hardware media decoder operative to decode the given digital content item to generate a second media signal; and d) a media output port mechanically integrated with the device housing for exporting at least one of the generated media signals.

According to some embodiments, the portable media device further comprises: e) exactly one onboard display screen mechanically integrated with the device housing for displaying the first media signal, wherein: i) the onboard display screen is operatively coupled to the first onboard hardware media decoder without being operatively coupled to the second onboard hardware media decoder; and ii) the media output port is operatively coupled to the second onboard hardware media decoder to export the second media signal; and iii) the first onboard hardware media decoder is configured within the portable media device such that no output media signal from the first onboard hardware media decoder may be exported from the portable media device to any external device.

According to some embodiments, a ratio between a power consumption of the second hardware media decoder and a power consumption of the first hardware media decoder is at least 2.

According to some embodiments, the portable media device further comprises: e) an onboard power source for powering the first hardware media decoder wherein: i) the media output port is a multi-function port that is also operative for receiving electrical power; and ii) operation of the second hardware media decoder is contingent upon an availability of external power via the media output port.

According to some embodiments, i) the first hardware media decoder is a hardware video decoder that is operative such that the first media signal is a first video signal; ii) the second hardware media decoder is a hardware video decoder that is operative such that the second media signal is a second video signal; and iii) the first and second hardware media decoders are configured such that at least one video quality relation selected from the group consisting of a first video quality relation and a second video quality relation is true; and iv) the first and second video quality relations are defined as follows: A) according to the first video quality relation, a ratio between a total number of pixels of a video image of the first video signal and a total number of pixels of a video image of the second video signal is at most 1/3; and B) according to the second video quality relation, a ratio between a color depth of a video image of the first video signal and a color depth of video image of the second video signal is at least 1.5.

According to some embodiments, i) the first hardware media decoder is a hardware streaming video decoder that is operative such that the first media signal is a first video stream; ii) the second hardware media decoder is a hardware streaming video decoder that is operative such that the second media signal is a second video stream; and iii) a ratio between a frame refresh rate of the first video stream and a refresh rate of the second video stream is at most 1/2.

According to some embodiments, i) the first and second hardware media decoders are operative so that at least one operation condition selected from the group consisting of a first operation condition and a second operation condition is true; and ii) the first and second operations condition are defined as follows: A) according to the first operation condition, the first and second hardware media decoders are operative to respectively generate the first and second media signals from the given digital media content item simultaneously; and B) according to the second operation condition, one of the first and second hardware media decoders is operative to effect a respective decoding at a time when the other of the first and second hardware media decoder is dormant.

According to some embodiments, i) the first and second hardware media decoders are operative so that at least one operation condition selected from the group consisting of a first operation condition and a second operation condition is true; and ii) the first and second operations condition are defined as follows: A) according to the first operation condition, at least one of the first media signal and the second media signal is a static video signal; and B) according to the second operation condition, each of the first hardware media decoder and the second hardware media decoder is hardware streaming media decoder.

According to some embodiments, i) the first hardware media decoder is a hardware streaming video decoder that is operative such that the first media signal is a first video stream; ii) the second hardware media decoder is a hardware streaming video decoder that is operative such that the second media signal is a second video stream; and iii) the first hardware media decoder and the second hardware media decoder are configured to effect the respective decodings so that the first and second video streams are synchronized playback streams of the given content item.

According to some embodiments, i) the first hardware media decoder is a hardware streaming video decoder that is operative such that the first media signal is a first video stream; ii) the second hardware media decoder is a hardware streaming video decoder that is operative such that the second media signal is a second video stream; and iii) the device further comprises: e) a user control for controlling a time difference between the first and second playbacks.

According to some embodiments, i) the device further comprises: e) an onboard media presentation device mechanically integrated with the device housing; and ii) the second hardware media decoder and the media output port are configured within the portable media device to respond to an inter-device coupling via the media port that occurs at a time when: A) the first hardware media decoder is decoding the given digital media content item to generate the first media signal from the digital media content item, and B) the onboard display presentation device is presenting the first media signal, by: I) commencing the decoding of the given digital media content item by the second hardware media decoder to generate the second media signal; and II) commencing the exporting via the media output port of the second media signal. According to some embodiments, the first hardware media decoder and the onboard media presentation device are configured within the portable media device to respond to the inter-device coupling by ceasing at least one of i) the decoding of the digital content item by the first hardware media decoder; and ii) the presenting of the first media signal by the onboard media presentation device.

According to some embodiments, the first hardware media decoder and the onboard media presentation device are configured within the portable media device to continue: i) the decoding of the digital content item by the first hardware media decoder; and ii) the presenting of the first media signal by the onboard media presentation device after the commencing of the decoding of the given digital content item by the second hardware media decoder which occurs after the inter-device coupling.

According to some embodiments, the second hardware media decoder is operative to commence the decoding of the given content item in accordance with a streaming media playback bookmark of the first hardware media decoder.

According to some embodiments, the first hardware media decoder and the second hardware media decoder are operative to simultaneously effect a playback of the given digital content item in a manner such that the second media signal provides at least one of: i) a look-ahead functionality relative to the first media signal; ii) a look-ahead functionality relative to the first media signal; and iii) a flexible time domain relative to the first media signal.

According to some embodiments, i) the portable media device further comprises: e) a media presentation device mechanically integrated with the device housing; and ii) the first hardware media decoder, the onboard media presentation device, the second hardware media decoder and the media output port are configured within the portable media device to respond to an inter-device decoupling via the media port that occurs at a time when: A) the second hardware media decoder is decoding the given digital media content item to generate the second media signal from the digital media content item; and B) the media output port is exporting the second media signal, by I) ceasing the decoding of the digital media content item by the second hardware media decoder; and II) commencing the decoding of the digital media content item by the first hardware media decoder to generate the first media signal and the presenting of the first media signal on the onboard display screen.

According to some embodiments, i) the portable media device further comprises: e) an onboard display screen mechanically integrated with the device housing; and ii) the first hardware media decoder, the onboard display screen, the second hardware media decoder and the media output port are configured within the portable media device to respond to an inter-device decoupling via the media port that occurs at a time when: A) the second hardware media decoder is decoding the given digital media content item to generate the second media signal from the digital media content item; B) the media output port is exporting the second media signal, C) the first hardware media decoder is decoding the given digital media content item to generate the first media signal from the digital media content item; and D) the onboard display screen is presenting the first media signal, by: I) ceasing the second digital media playback of the digital media content item by the second hardware media decoder; and II) continuing the first digital media playback of the digital media content item by the first hardware media decoder to generate the first video stream and the presenting of the first media on the onboard display screen.

According to some embodiments, i) the portable media device further comprises: g) a user control for effecting a mode transition between any of a first mode, a second mode and a third mode; and ii) the first, second and third modes are defined as follows: A) when in the first mode, the first hardware media decoder is active and the second hardware media decoder is dormant; B) when in the second mode, the second hardware media decoder is active and the first hardware media decoder is dormant; and C) when in the third mode, both of the first hardware media decoder is active and the second hardware media decoder are active.

It is now disclosed for the first time a portable media device comprising: a) a first onboard hardware media decoder; b) a second onboard hardware media decoder; and c) control circuitry operative to: i) determine if external available power is available to the portable media device; ii) if the external power is available, activating the second onboard hardware media decoder; and iii) otherwise, if the external power is not available, activating the first onboard hardware media decoder without activating the second onboard hardware media decoder.

According to some embodiments, a ratio between a power consumption of the second hardware media decoder and a power consumption of the first hardware media decoder is at least 2.

According to some embodiments, i) the first hardware media decoder is a hardware streaming video decoder that is operative to generate a first video stream; ii) the second hardware media decoder is a hardware streaming video decoder that is operative to generate a first video stream; and iii) the first and second hardware media decoders are configured such that at least one video quality relation selected from the group consisting of a first video quality relation, a second video quality relation and a third video quality relation is true; and iv) the first, second and third video quality relations are defined as follows: A) according to the first video quality relation, a ratio between a total number of pixels of a video image of the first video stream and a total number of pixels of a video image of the second video stream is at most 1/3; B) according to the second video quality relation, a ratio between a frame refresh rate of the first video stream and a refresh rate of the second video stream is at most 1/2; and C) according to the third video quality relation, a ratio between a color depth of the first video stream and a color depth of the second video stream is at least 1.5.

It is now disclosed for the first time a method of operating a media device having a first onboard hardware media decoder and a second onboard hardware media decoder, the method comprising: a) determining if external available power is available to the media device; b) if the external power is available, activate the second onboard hardware media decoder; and c) otherwise, activate the first onboard hardware media decoder without activating the second onboard hardware media decoder.

It is now disclosed for the first time a method of operating a media device having a low-power onboard hardware media decoder, a high-power onboard hardware media decoder, an onboard display screen and a device port, the method comprising: a) using the low-power hardware onboard decoder, effecting a first media playback to generate a first video stream; b) presenting the first video stream on the onboard display screen; c) in response to a detected coupling event of the device port that occurs at a time when: i) the low-power onboard hardware media decoder is generating the first video stream; and ii) the onboard display screen is presenting the first video stream, commencing a second media playback, using the high-power onboard hardware media decoder, to generate a second media stream; and d) exporting the second media stream via the device port.

According to some embodiments, the method further comprises: e) in response to the detected coupling event, ceasing the first playback by the low-power onboard hardware media decoder.

According to some embodiments, the first media playback and the presentation of the first video stream of step (b) continues simultaneously with the exporting of the second media stream via the device port.

According to some embodiments, the second media playback of step (c) is carried out in accordance with a media bookmark of the first media playback by the low-power onboard hardware media decoder at a time of the device port coupling event.

It is now disclosed for the first time a method of operating a media device having a low-power onboard hardware media decoder and a high-power onboard hardware media decoder, an onboard screen and a device port. The method comprises: a) using the high-power onboard hardware media decoder, generating a first video stream; b) exporting the first video stream via the device port; c) in response to a detected decoupling event of the device port that occurs at a time of the exporting, commencing a second media playback, using the low-power onboard hardware media decoder, to generate a second media stream; and d) presenting the second video stream on the onboard screen.

According to some embodiments, the second media playback of step (c) is carried out in accordance with a media bookmark of the high-power onboard hardware media decoder at a time of the device port decoupling event.

It is now disclosed for the first time a method of decoding a given digital content item by a portable media device having a housing, a first onboard hardware media decoder associated with the device housing, a second onboard hardware media decoder associated with the device housing and a media output port mechanically integrated with the device housing, the method comprising: a) using the first onboard hardware media decoder associated with the device housing of the portable media device, effecting a first media decoding of the given digital content item to generate a first media signal from the given digital content item; b) using the second onboard hardware media decoder associated with the device housing of the portable media device, effecting a second media decoding of the given digital content item to generate a second media signal; and c) exporting at least one of the generated media signals via the media output port that is mechanically integrated with the device housing.

According to some embodiments, i) the method further comprises: d) displaying the first media signal on an onboard display screen that is mechanically integrated with the device housing of the portable media device; ii) the exporting of step (c) includes exporting the second media signal via the media output port; and iii) the method is carried out so that no output media signal from the first onboard hardware media decoder is exported from the portable media device to any external device.

According to some embodiments, the first and second decodings are carried out such that a ratio between a power consumption of the second hardware media decoder at a time of the second decoding and a power consumption of the first hardware media decoder at a time of the first decoding is at least 2.

According to some embodiments, i) the effecting of the second decoding is contingent upon an availability of external power to the portable media device via the media output port; and ii) the effecting of the first decoding is not contingent upon an availability of any external power to the portable media device.

According to some embodiments, i) the first media decoding is a first video decoding so that the first media signal is a first video signal; ii) the second media decoding is a second video decoding so that the second media signal is a second video signal; iii) the first and second video decodings are carried out such that at least one video quality relation selected from the group consisting of a first video quality relation and a second video quality relation is true; and iv) the first and second video quality relations are defined as follows: A) according to the first video quality relation, a ratio between a total number of pixels of a video image of the first video signal and a total number of pixels of a video image of the second video signal is at most 1/3 ; and B) according to the second video quality relation, a ratio between a color depth of a video image of the first video signal and a color depth of video image of the second video signal is at least 1.5.

According to some embodiments, i) the first media decoding is a first video stream decoding so that the first media signal is a first video stream; ii) the second media decoding is a second video stream decoding so that the second media signal is a second video stream; iii) the first and second video stream decodings are carried out such that a ratio between a frame refresh rate of the first video stream and a refresh rate of the second video stream is at most 1/2.

According to some embodiments, i) the first and second media decoding are carried out so that at least one operation condition selected from the group consisting of a first operation condition and a second operation condition is true; and ii) the first and second operations condition are defined as follows: A) according to the first operation condition, the first and second media signals are simultaneously generated from the given digital media content item; and B) according to the second operation condition, the first and second media signals are generated sequentially.

According to some embodiments, i) the first and second media decoding are carried out so that at least one operation condition selected from the group consisting of a first operation condition and a second operation condition is true; and ii) the first and second operations condition are defined as follows: A) according to the first operation condition, at least one of the first media signal and the second media signal is a static video signal; and B) according to the second operation condition, each of the first and second media signals is a streaming video signal.

According to some embodiments, i) the first media decoding is carried out so that the first media signal is a first video stream; ii) the second media decoding is carried out so that the first media signal is a second video stream; and iii) the first and second media decodings carried out so that the first and second video streams are synchronized playback streams of the given content item.

According to some embodiments, i) the first media decoding is carried out so that the first media signal is a first video stream; ii) the second media decoding is carried out so that the first media signal is a second video stream; iii) the method further comprises: d) in accordance with input received via a user control mechanically integrated with the housing of the portable media device, determining a video stream time difference between the first and second playbacks; and iv) the first and second media decodings are carried out according to the determined video stream time difference.

According to some embodiments, i) the method further comprises: d) presenting the first media signal on an onboard media presentation device mechanically integrated with the device housing; e) detecting an inter-device coupling via the media port at a time when: A) the first media decoding is being carried out by the first onboard media decoder to generate the first media signal from the digital media content item; and B) the onboard display presentation device is presenting the first media signal; ii) the second decoding of the given digital media content item by the second hardware media decoder to generate the second media signal is commenced in response to the detected inter-device coupling; and iii) the exporting of the second media signal via the media output port is carried out in response to the detected inter-device coupling.

According to some embodiments, the method further comprises: f) further responding to the inter-device coupling by ceasing at least one of: i) the decoding of the digital content item by the first hardware media decoder; and ii) the presenting of the first media signal by the onboard media presentation device.

According to some embodiments, the method further comprises: f) after the commencing of the second decoding of the given digital content item by the second hardware media decoder which occurs after the inter-device coupling, continuing: i) the first decoding of the digital content item by the first hardware media decoder; and ii) the presenting of the first media signal by the onboard media presentation device.

According to some embodiments, the commencing of the second decoding of the given content item by the second hardware media decoder is carried out in accordance with a streaming media playback bookmark of the first hardware media decoder.

According to some embodiments, the first and second media decodings are carried out to provide at least one of: i) a look-ahead functionality of the second media signal relative to the first media signal; ii) a look-back functionality of the second media signal relative to the first media signal; and iii) a flexible time domain of the second media signal relative to the first media signal.

According to some embodiments, i) the method further comprises: d) detecting a decoupling via the media port that occurs at a time when: A) the second hardware media decoder is effecting the second media decoding of the given digital media content item to generate the second media signal from the digital media content item; and B) the media output port is exporting the second media signal, and e) in response to the detected decoupling, ceasing the second media decoding of the digital media content item by the second hardware media decoder; and ii) the first media decoding of the given digital media content item by the first hardware media decoder is commenced in response to the detected decoupling.

According to some embodiments, the method further comprises: d) displaying the first media signal on an onboard display mechanically integrated with the device housing; e) detecting a decoupling via the media port that occurs at a time when: A) the second hardware media decoder is effecting the second media decoding of the given digital media content item to generate the second media signal from the digital media content item; B) the media output port is exporting the second media signal, C) the first hardware media decoder is effecting the first media decoding of the given digital media content item to generate the first media signal from the digital media content item; and D) the first media signal is display on the onboard display; and f) in response to the detected decoupling, ceasing the second media decoding of the digital media content item by the second hardware media decoder; and g) continuing the first media decoding and the displaying of the first media signal after the detecting and after the ceasing.

According to some embodiments, the method further comprises: h) in accordance with input received via a user control mechanically integrated with the housing of the portable media device, effecting a mode transition between any of a first mode, a second mode and a third mode, wherein the first, second and third modes are defined as follows: i) when in the first mode, the first hardware media decoder is active and the second hardware media decoder is dormant; ii) when in the second mode, the second hardware media decoder is active and the first hardware media decoder is dormant; and iii) when in the third mode, both of the first hardware media decoder is active and the second hardware media decoder are active.

It is now disclosed for the first time a method of operating a media device having a first onboard hardware media decoder and a second onboard hardware media decoder, the method comprising: a) determining if external available power is available to the media device; b) if the external power is available, activate the second onboard hardware media decoder; and c) otherwise, activate the first onboard hardware media decoder without activating the second onboard hardware media decoder.

It is now disclosed for the first time a method of operating a media device having a low-power onboard hardware media decoder a high-power onboard hardware media decoder an onboard display screen and a device port the method comprising: a) using the low-power hardware onboard decoder effecting a first media playback to generate a first video stream; b) presenting the first video stream on the onboard display screen; c) in response to a detected coupling event of the device port that occurs at a time when: i) the low-power onboard hardware media decoder is generating the first video stream; and ii) the onboard display screen is presenting the first video stream, commencing a second media playback, using the high-power onboard hardware media decoder, to generate a second media stream; and d) exporting the second media stream via the device port.

According to some embodiments, the method further comprises: e) in response to the detected coupling event, ceasing the first playback by the low-power onboard hardware media decoder.

According to some embodiments, the first media playback and the presentation of the first video stream of step (b) continues simultaneously with the exporting of the second media stream via the device port.

According to some embodiments, the second media playback of step (c) is carried out in accordance with a media bookmark of the first media playback by the low-power onboard hardware media decoder at a time of the device port coupling event.

It is now disclosed for the first time a method of operating a media device having a low-power onboard hardware media decoder and a high-power onboard hardware media decoder, an onboard screen and a device port, the method comprising: a) using the high-power onboard hardware media decoder, generating a first video stream; b) exporting the first video stream via the device port; c) in response to a detected decoupling event of the device port that occurs at a time of the exporting, commencing a second media playback, using the low-power onboard hardware media decoder, to generate a second media stream; and d) presenting the second video stream on the onboard screen.

According to some embodiments, the second media playback of step (c) is carried out in accordance with a media bookmark of the high-power onboard hardware media decoder at a time of the device port decoupling event.

It is noted that features described above as pertaining to certain embodiments may also be included in other embodiments, unless indicated to the contrary hereinbelow.

DETAILED DESCRIPTION OF EMBODIMENTS

The claims below will be better understood by referring to the present detailed description of example embodiments with reference to the figures. The description, embodiments and figures are not to be taken as limiting the scope of the claims. It should be understood that not every feature of the presently disclosed portable media device and method of operating the same is necessary in every implementation. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e., meaning "having the potential to"), rather than the mandatory sense (i.e. meaning "must").

Figure 1:
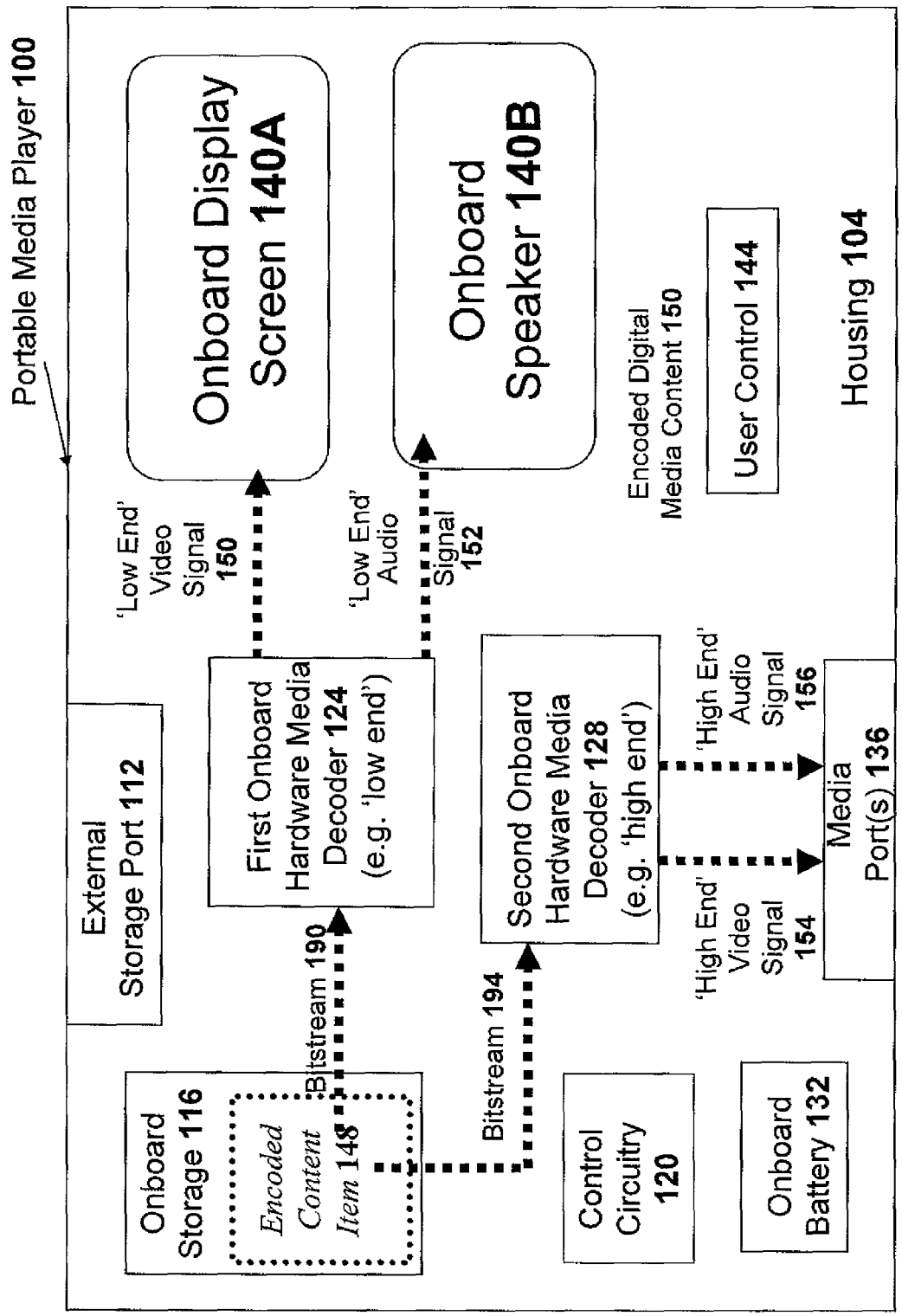
FIG. 1 is a block diagram of an exemplary portable media device according to some embodiments.

A Brief Discussion of FIG. 1

FIG. 1 is a block diagram of an exemplary portable media device 100 in accordance with some embodiments. The portable media device 100 of FIG. 1 includes (i) a device housing 104; (ii) an onboard storage 116 in which a digital media content item 148 (for example, an image file such as a jpeg file, or an audio file such as an mp3 file, or a movie file such as an MPEG file) is stored; (iii) first 124 and second 128 onboard hardware media decoders, each of which is operative to decode digital media content item 148 to generate respective a video (150 or 154) and/or audio (152 or 156) signal; (iv) at least one onboard media presentation device 140 (i.e. onboard display screen 140A and/or onboard speaker 140B) which is operative to 'present' at least one media signal (i.e. a video 150 or audio 152 signal) generated by the first 124 onboard hardware media decoder; and (v) at least one media port 136 for exporting at least one media signal (i.e. a video 154 or audio 156 signal) generated by the second 128 onboard hardware media decoder. The generated media signal(s) (150 and/or 152 and/or 154 and/or 156) may be either analog and/or digital.

One salient feature of the portable media player 100 of FIG. 1 is that two separate hardware media decoders (124 and 128) are operative to decode the same given content item 148. Thus, in different examples, both hardware media decoders are MPEG decoders, or both hardware media decoders are mp3 decoders, etc. In the example of FIG. 1, the given content item 148 resides in a 'common' onboard storage 116 (for example, including flash memory or magnetic storage such as a hard disk) which is accessible by both onboard hardware media decoders In some embodiments, the first 124 onboard hardware media decoder is a relatively 'low end' hardware media decoder having a relatively 'low' power consumption and/or operative to produce 'lower quality' video while the second onboard hardware media decoder 128 is a relatively 'high end" media decoder having a relatively 'high' power consumption and/or operative to produce 'higher quality' video. As will be explained below with reference to other figures (for example, FIGS. 3A-3B), this may be useful for providing a device which: (i) when external power is available, generates a relatively 'high end' or 'high quality' media signal(s) (i.e. by second onboard hardware media decoder 128) which is exported via media port(s) 136; and (ii) when external power is unavailable (i.e. when the only source of electrical power is onboard battery 132), generates a relatively 'low end' or 'low quality' media signal(s) (i.e. by first onboard hardware media decoder 124) which is presented on one or more of the onboard presentation device(s) 140.

In one non-limiting example, (i) the first 124 onboard hardware media decoder generates a so-called 1/4 VGA signal providing images of 320×240 pixels, while the second 128 onboard hardware media decoder generates a so-called XGA signal providing images of 1024×658 pixels; and (ii) the first 124 onboard hardware media decoder has a power consumption that is only a fraction (for example, less than half, or less than a quarter) of the power consumption of the second 128 onboard hardware media decoder.

In one non-limiting example, a ratio between a power consumption of the second onboard hardware media decoder 128 and a power consumption of the first onboard hardware media decoder 124 is at least 2.

User control 144 and control circuitry 120 will be discussed below.

A Discussion of FIGS. 2A-2D

Figure 2A:
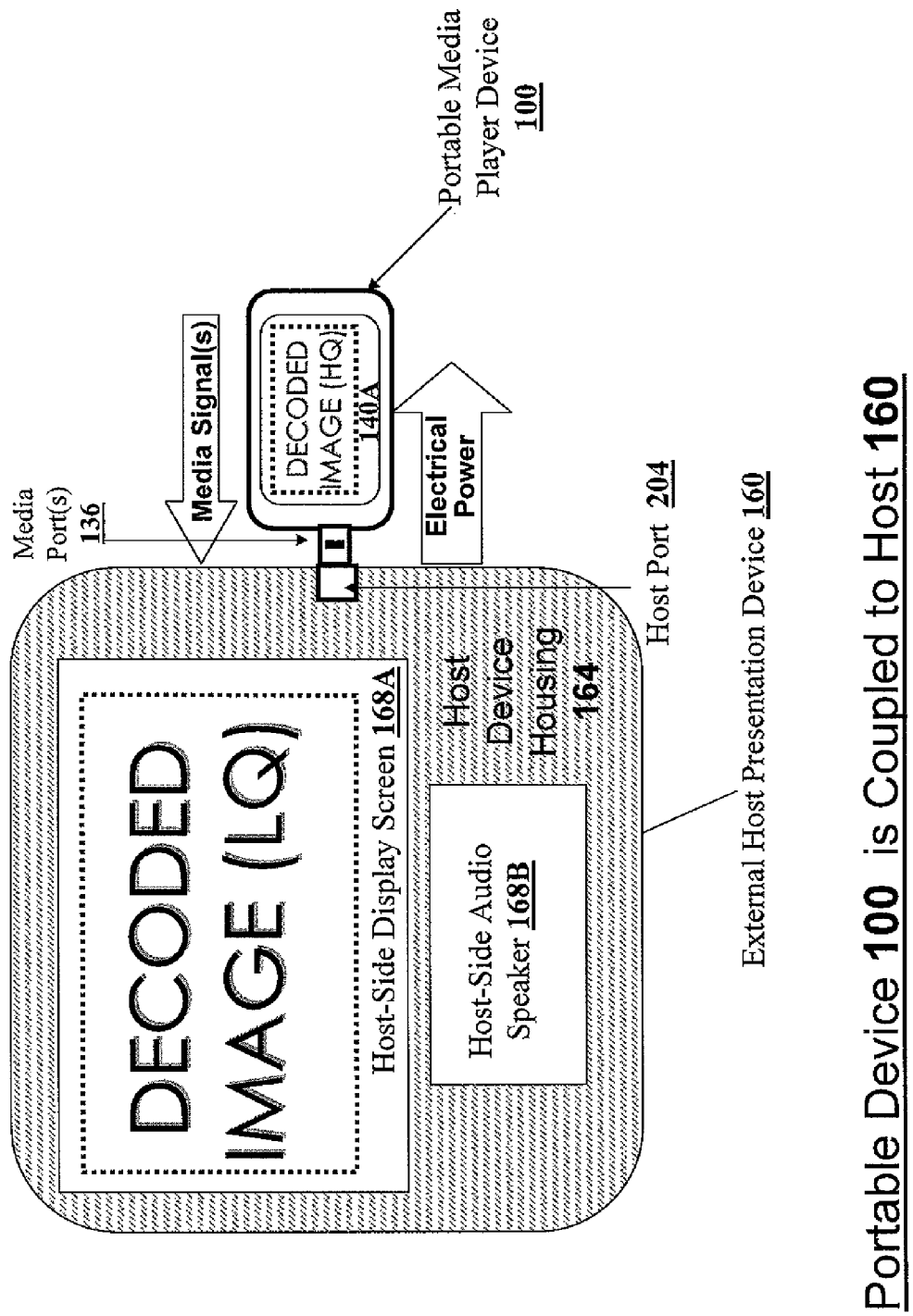
FIGS. 2A, 2C, 2D are drawings of an exemplary portable media device when coupled to an external host presentation device.

FIG. 2A is a drawing of the portable media player 100 when coupled with an 'external' host presentation device 160, for example, a 'large' television device including host-side display screen 168 and host-audio speaker 172. External host presentation device 160 includes a host device housing 164 and host port 204 (for example, an HDMI socket) which may be mechanically integrated into the host housing. In the example of FIG. 2A, the external screen 168 is 'significantly larger' than the relatively 'small' onboard screen 140A of portable media player 100.

In the example of FIG. 2A, portable media player 100 is coupled to external host presentation device 160 via media port 136 and host port 204. Portable media player 100 exports one or more media signals (for example, 'high end' video signal 154 and/or 'high end' audio signal 156, each of which may be generated by second onboard hardware media decoder 128) to external host presentation device 160 via media port 136 and host port 204. The exported media signal(s) are received by host presentation device 160 and presented on one or more host-side media display devices 168 (i.e. host-side display screen 168 and/or host-side audio speaker 172). In one non-limiting example, the exported media signals are 'streams' and it is possible to view a 'movie' on external host presentation device 160.

In the example of FIG. 2A, both the first onboard hardware media decoder 124 and the second onboard hardware media decoder 128 are simultaneously 'active' where (i) the image (i.e. of low end video signal 150) generated by the first onboard hardware media decoder 124 and presented on onboard screen 140A is of a relative 'low quality' (LQ) and (ii) the image (i.e. of high end video signal 154) generated by the second onboard hardware media decoder 128 (i.e. of low end video signal 150) an exported to the external host presentation device 160 is of a relatively 'high quality' (HQ).

In the example of FIG. 2A, media output port 136 is a 'multi-functional device port' which is also configured to receive external electrical power from external host presentation device 160. Thus, as illustrated in FIG. 2A, a media signal (see the left arrow) is exported from portable media player 100 while external electrical power (see the right arrow) is simultaneously received into portable media player 100 from host presentation device 160. In some embodiments, the received external electrical power may be used to power second onboard hardware media decoder 128 whose power consumption may be greater, or even significantly greater than the power consumption of hardware media decoder 124.

It is noted that there is no requirement that media output port 136 is a 'multi-functional device port.' Alternatively or additionally, a separate power input port (NOT SHOWN) that is separate from media output port 136 is provided.

In one non-limiting use case, when the portable media device 100 is not coupled to external host presentation device 160 (see FIG. 2B): (i) no external electrical power is available; (ii) the 'high-end' second hardware media decoder 128 is dormant; and (iii) the 'low-end' first hardware media decoder 124 generates (i.e. using internal electrical power from onboard battery 132) a 'low-end' media signal(s) (150 and/or 152) which is presented on an onboard presentation device 140. When portable media device 100 is coupled to external host presentation device 160 (see FIG. 2A and FIG. 2C): (i) external electrical power is received from external host presentation device 160 (for example, via media port(s) 136; and (ii) the high-end second hardware media decoder 128 generates (i.e. using external electrical power) a 'high-end' media signal(s) which is exported to external host presentation device 160 via media port(s) 136

Although the second media signal(s) (154 and/or 156) which is exported to external host presentation device 160 and the media signal(s) (150 and/or 152) which is presented on the 'onboard' presentation device 140 are representative of the same digital media content item 148, the signals, in the current example, are not identical. In the current example, first media signal(s) (150 and/or 152) is a relatively 'low-end' signal(s), while the second media signal(s) (154 and/or 156) is a relatively 'high-end' signal(s) with relatively 'high' power requirements. In one non-limiting use case, this allows a user to view and/or listen to 'lower quality' media content when no external power is available (i.e. according to certain quality 'limitations') without being constrained by these quality 'limitations' when external power, and an external media presentation device, are available.

In the example of FIG. 2A, both the first onboard hardware media decoder 124 and the second onboard hardware media decoder 128 are simultaneously 'active' to simultaneously generate respective media signals. In the example of FIG. 2C, only the 'high end' media signal (i.e. 154 and/or 156) is presented, and no 'low-end' signal is generated and/or presented on the onboard display device 140. Thus, onboard screen 140A is illustrated as a 'blank screen.'

In the example of FIG. 2A, the image displayed on external host presentation device 160 (i.e. which is generated by the second hardware media decoder 128) is a 'higher quality' version of the same image presented on the onboard display device 140A (i.e. which is generated by the first hardware media decoder 124). In the example of FIG. 2D, completely different images are displayed.

An Additional Brief Discussion of FIG. 1

It is noted that in the non-limiting example of FIG. 1, the portable media device 104 includes exactly one onboard display screen 140A which is mechanically integrated with the device housing 104—i.e. portable media device 104 does not provide multiple display screens.

Furthermore, in the example of FIG. 1, it is noted that the onboard media presentation device(s) 140 is operatively coupled to the first onboard hardware media decoder 124 (i.e. and presents a media stream(s) received from the first onboard hardware media decoder 124) but is not operatively coupled to the second onboard hardware media decoder 128.

For example, if first onboard hardware media decoder 124 generates relatively 'low quality' video while second onboard hardware media decoder 128, then there is no display of the 'high quality' video signal on the 'small' onboard video screen.

Thus, in the example of FIG. 1, video signal 154 generated by second onboard hardware media decoder 128 may be exported (for example to external host presentation device 160) even if this video signal 154 may not be displayable on the local onboard display screen 140A.

In some embodiments, as illustrated in FIG. 1, there is no need to export the 'low end' video signal 150, and this 'low end' video signal is displayable only on the onboard screen 140A. Thus, in some embodiments, first onboard hardware media decoder 124 is not operatively coupled to any device port, and no output media signal from the first onboard hardware media decoder 124 may be exported from the portable media device 100 to any external device.

Definitions

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

A 'digital signal processor' (DSP) is a specialized microprocessor designed specifically for digital signal processing.

A 'chipset' refers to a specialized group of integrated circuits of chips that are designed to work together, and are often marketed as a single product or module.

A 'digital media content item' refers to a data object (for example, a computer file(s)) that includes encoded media content—i.e. audio content and/or encoded video content. Exemplary digital media content items include but are not limited to .mp3 files, jpeg files, mpeg files, divx files, and XviD files.

A 'media decoder' refers to a specialized chip or group of chips, or to a software program executable by a microprocessor which enables (i) decompression and/or decoding of audio or video digital media content (for example, received as a bitstream); and at least one of (ii)(a) for the case of audio content, playback of the audio content to generate an analog or digital audio stream; (ii)(b) for the case of video content, rendering of the video content to generate one or more analog or digital images or frames.

It is noted that the term "video" signal may refer to: (i) an electrical signal representative of a 'moving picture' or 'movie'—i.e. a video 'stream'; and/or (ii) an electrical signal representative of a 'still image' or 'static image' that is not representative of a 'moving picture.' The video signal may refer to an analog video signal or a digital video signal.

Thus, in one example, a "video decoder" may be operative to generate a "still" or "static" video image. Alternatively or additionally, the "video decoder" may be a "streaming media decoder" operative to generate a video signal that is a 'video stream' representative of a moving picture.

A 'streaming media decoder' is a decoder that is decoder that is operative to effect a video or audio playback to generate a video or audio stream. A "CODEC" is a device or program capable of encoding and/or decoding a digital data stream or signal. Thus, a 'streaming media decoder' is a specific type of 'CODEC.'

One specific type of 'media decoder' is a 'hardware media decoder' or 'decoder core' which is a specialized chip or chipset specifically configured to provide the aforementioned 'media decoder' functionality. Because the portable media device 100 of FIG. 1 has two separate hardware media decoders, the portable media device 100 of FIG. 1 is a 'dual core' device.

One example of a commercially available 'hardware media decoder' is the Vaddis® 888 available from the Zoran Corporation of Haifa, Israel. Another example of a commercially available 'hardware media decoder' is the S5L8700X media decoder chip from the Samsung Group of Seoul, South Korea (this second example is an 'audio decoder' which generates an audio signal and does not generate a video signal). Another example of a commercially available 'hardware media decoder' the VIA CX700M system media processor, an all-in-one digital media IGP chipset from VIA Technologies, Inc. of Taipei, Taiwan. When a component of portable media device 100 is an "onboard' component, this refers to a component that is (i) located within device housing 104; and/or (ii) attached to the inside and/or outside of device housing 104.

A "hardware streaming media decoder" (for example, a hardware streaming video decoder or a hardware streaming audio decoder) is a hardware media decoder that is also a streaming media decoders.

A "media presentation device" refers to a display screen and/or an audio speaker.

The terms "low end" and "high end" are intended as relative terms, and refer to the relative quality of the media signal(s) generated by the first and second onboard media player.

The terms "low-power onboard hardware media decoder" and "high-power onboard hardware media decoder" are relative terms, and refer to hardware media decoders where a ratio between power consumption of the high-power hardware media decoder and the low-power hardware media decoder is at least 2. In some embodiments, this ratio is at least 5.

At a given time, a hardware media decoder (124 or 128) may be 'active' or 'dormant.' When active, the hardware media decoder is decoding encoded media content (for example, as a bitstream 190 or 194) to generate a video and/or audio media signal. When 'dormant' the hardware media decoder is not effecting any decoding. In some embodiments, a power consumption of hardware media decoder when the decoder is "dormant" is not more than 20% of a power consumption of the hardware media decoder when the decoder is "active."

Control circuitry 120 refers to any combination of hardware (for example, including a microprocessor and optionally volatile memory such as RAM or registers), firmware and/or software (for example, computer code which is stored in volatile and/or non-volatile memory and is executable by a microprocessor).

In some embodiments, control circuitry 120 provides power regulation functionality (for example, see FIGS. 3A-3B and FIGS. 5A-5B, 6A-6B).

In some embodiments, control circuitry 120 is operative to determine a relationship between media content (for example, a sub-portion of content item 148) which is decoded by first hardware media decoder 124 and second hardware media decoder 128 for example, see FIGS. 4A-4C, 7A-7C.

Figure 3A:
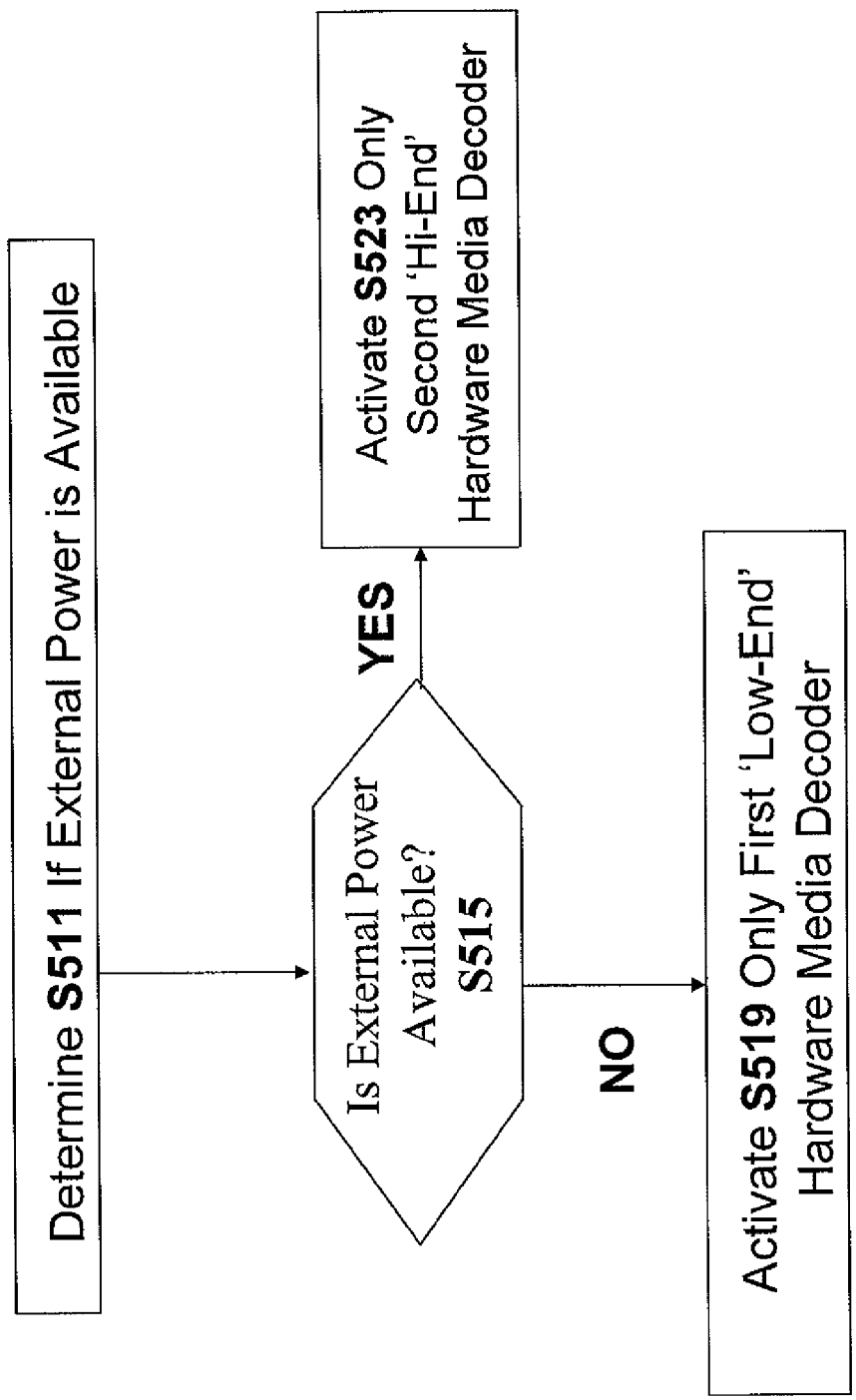
FIGS. 3A-3B are flowcharts of routines for effecting media decoding(s) in accordance with an availability of external electrical power.
Figure 3B:
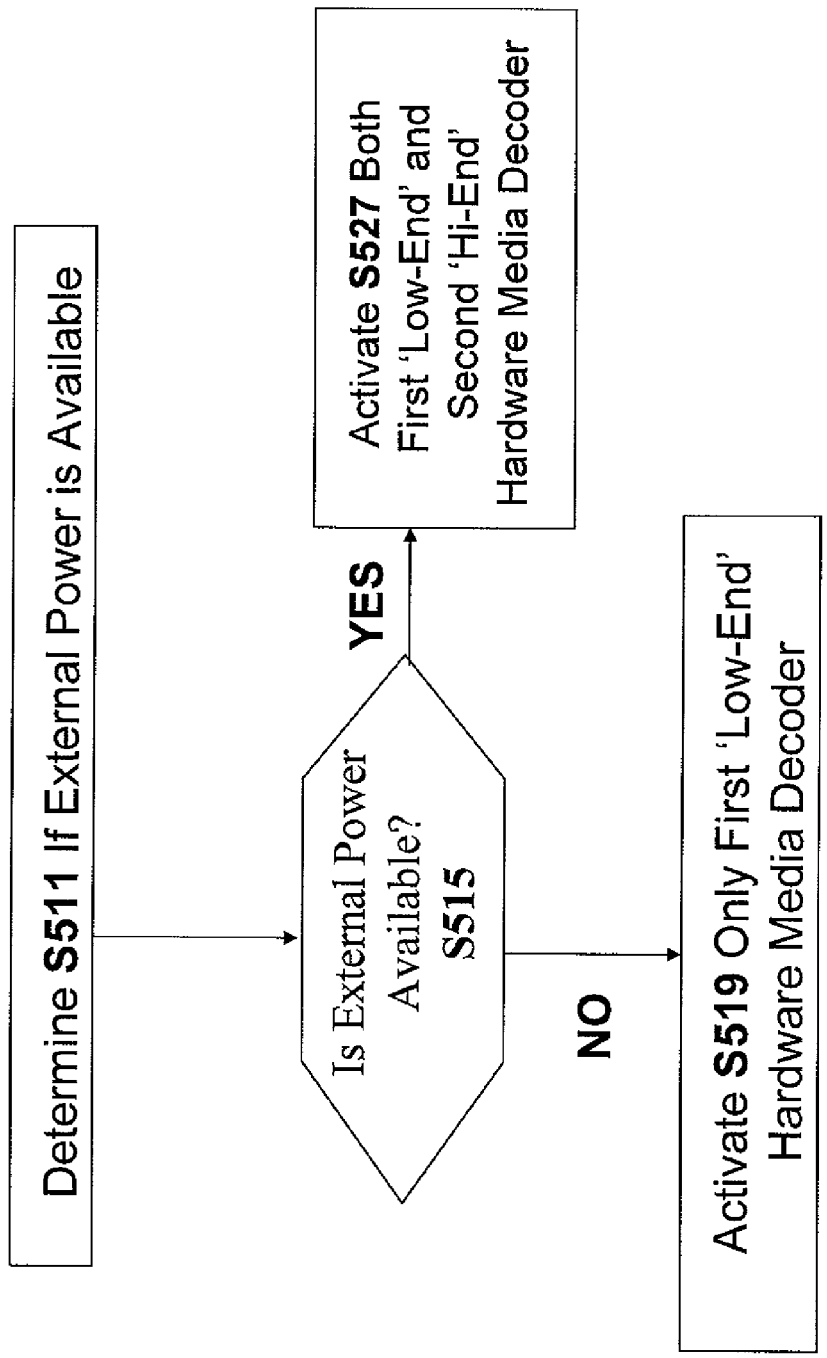

A Discussion of FIGS. 3A-3B

FIG. 3A is a flow chart of a routine for power management in accordance with some embodiments. In step S511, a determination for example, by control circuitry 120, is made if external power is available. In the event that external power is available (see step S515), then the second 'hi-end' hardware media decoder 128 is activated (for example, by control circuitry 120) in step S523, and the second hardware media decoder 128 decodes media content when activated.

In the event that external power is not available, then it is necessary to rely on the first 'low-end' media decoder. Thus, in the event that external power is not available, then the first hardware media decoder 124 is activated.

FIG. 3B is another flow chart of a routine for power management in accordance with some embodiments. The routine of FIG. 3A is similar to the routine of FIG. 3B, except for the fact that: (i) in step S523 of FIG. 3A, only the second 'hi-end' hardware media decoder 128 is activated without also activating the first 'hi-end' hardware media decoder 124; (ii) in step S527 of FIG. 3B, both the first 'low-end' hardware media decoder 124 and the second 'hi-end' hardware media decoder 128 are activated.

In one example related to the FIGS. 3A-3B, operation of the second hardware media decoder 128 is contingent upon an availability of external power, for example, external power received via the media output port 136.

Figure 4A:
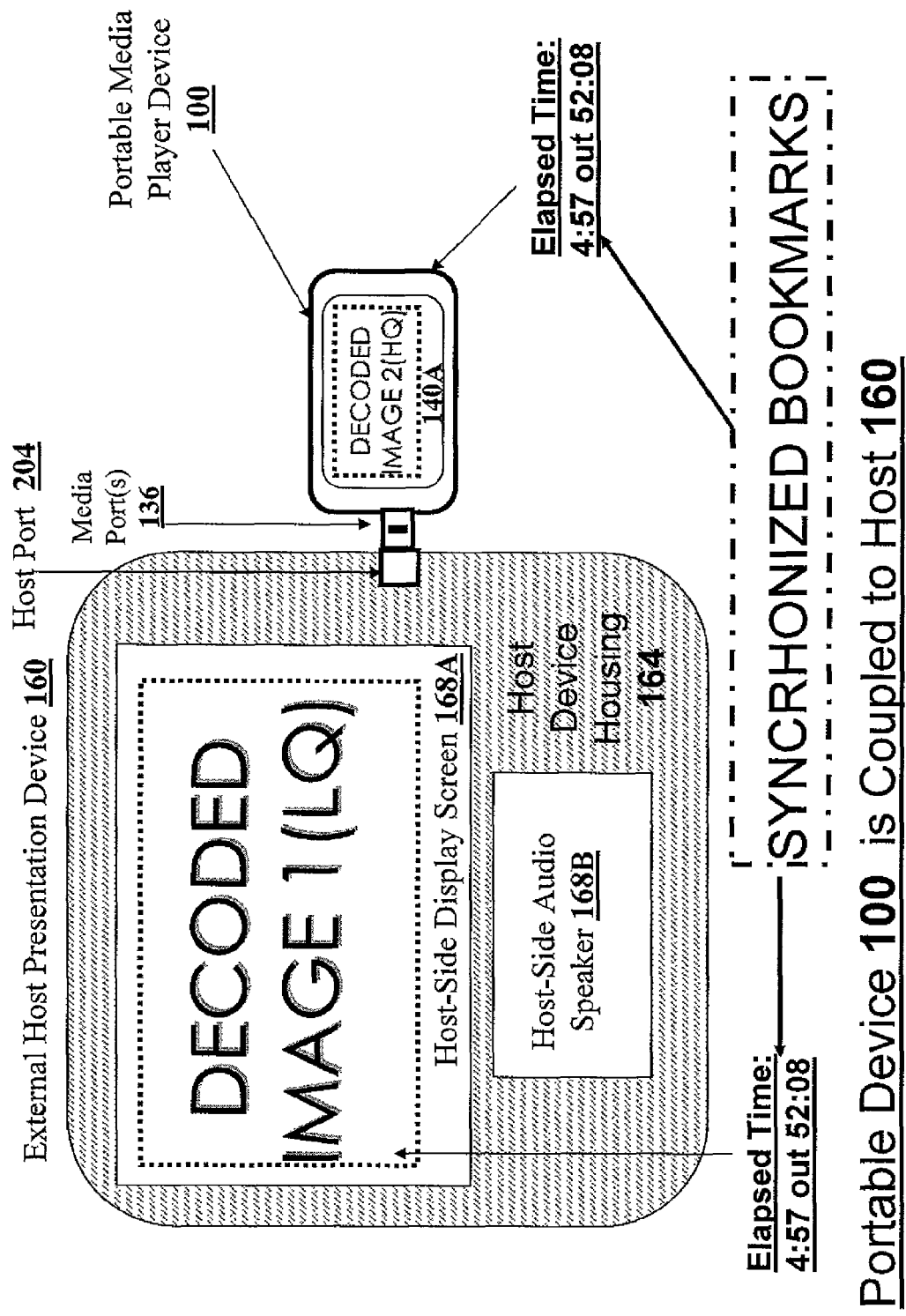
FIG. 4A is a drawing of an exemplary portable media device that provides synchronized media playback functionality.
Figure 4B:
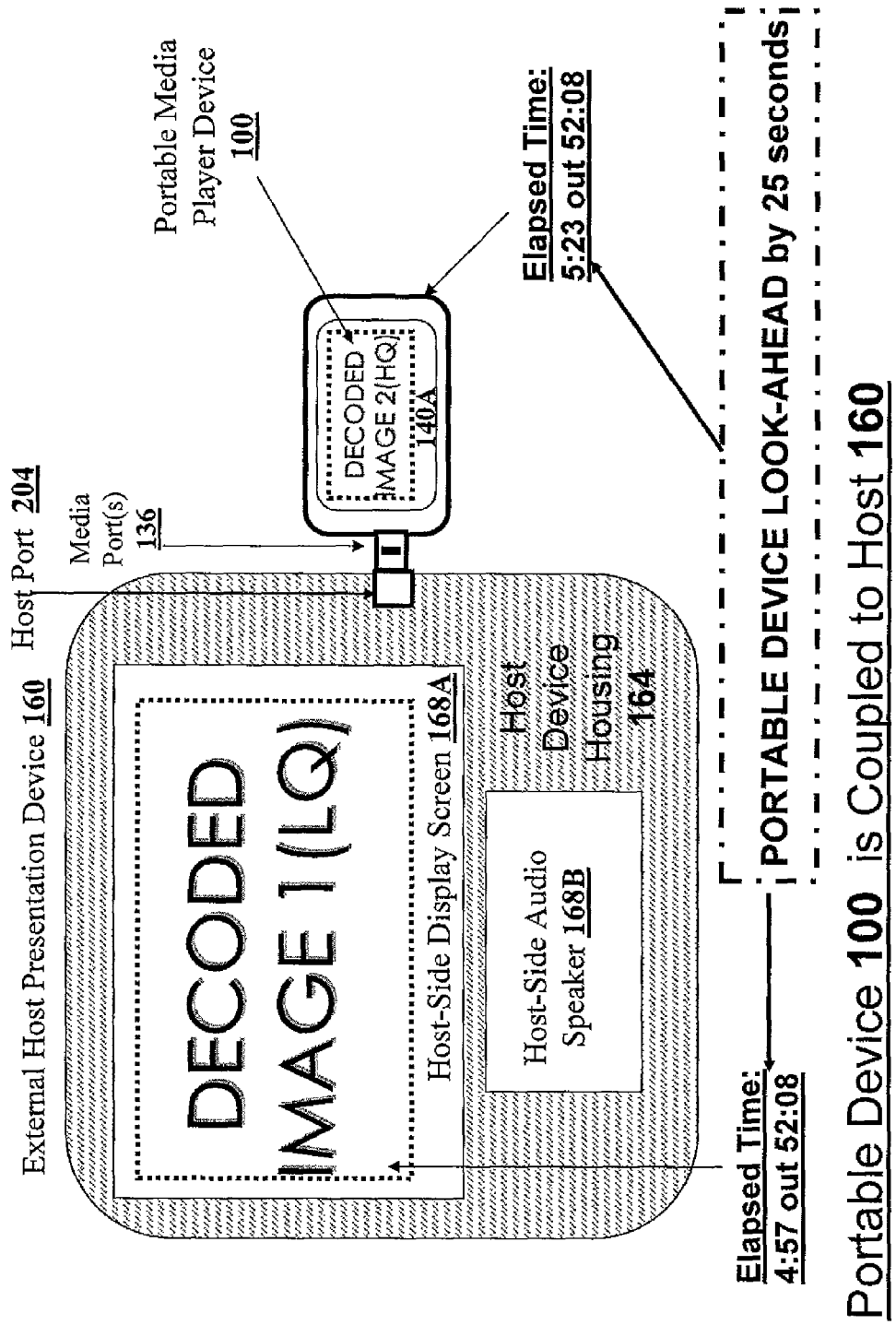
FIGS. 4B-4C are drawings of an exemplary portable media device that provides look-ahead functionality.
Figure 4C:
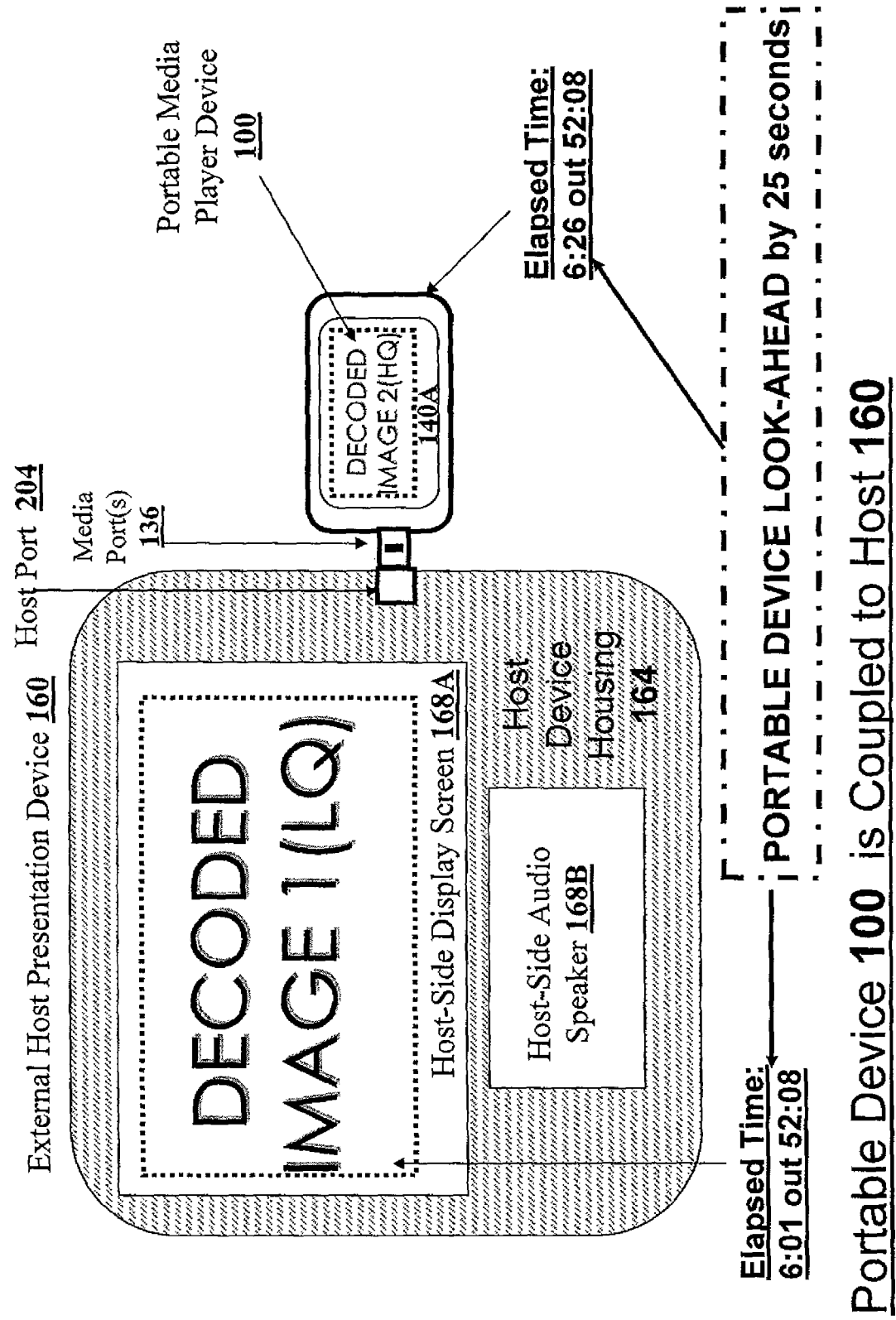

A Discussion of FIG. 4A-4C

In some embodiments, both first hardware media decoder 124 and second hardware media decoder 128 are hardware 'streaming media decoders' operative to effect a playback of a sound digital media (for example, an mp3 file) and/or a 'movie' digital media (for example, an MPEG file) to generate streaming video and/or streaming audio.

Reference is now made to FIG. 4A. In FIG. 4A, the media device 100 is used to playback a movie whose length is 52:08. First hardware media decoder 124 and second hardware media decoder 128 operate simultaneously, to effect simultaneous playbacks. The video output of the first hardware media decoder 124 is displayed on the onboard display screen 140A, while the output of the second hardware media decoder 124 is exported to the host on the onboard display screen 140A.

In the example of FIG. 4A, the first video decoding by the first hardware media decoder 124 is "synchronized" with the second video decoding by the first hardware media decoder 128 so that the frame associated with an elapsed time of 4:57 is displayed simultaneously on both screens. In one implementation, the control circuitry 120 issues a directive to commence the playback on both media decoders simultaneously. Alternatively, one of the media decoders commences playback, and at a later time a "bookmark" indicative of an "elapsed time location" within the movie timeline is passed from one of the media decoders to the other media decoder by control circuitry 120.

Reference is now made to FIGS. 413-4C. In FIGS. 4B-4C, the media device 100 is used to playback the same video clip as in FIG. 4A. First hardware media decoder 124 and second hardware media decoder 128 operate simultaneously, to effect simultaneous playbacks. The video output of the first hardware media decoder 124 is displayed on the onboard display screen 140A, while the output of the second hardware media decoder 124 is exported to the host on the onboard display screen 140A.

In the example of FIG. 4B-4C, the first video decoding by the first hardware media decoder 124 is "synchronized with a look ahead functionality" with the second video decoding by the first hardware media decoder 128—i.e. the rate of playback is the same, but the image displayed on local display screen 140A (i.e. decoded by first hardware media decoder 124) is a "preview" that is 25 seconds ahead of the image displayed on the external screen (i.e. decoded by first hardware media decoder 128).

In the example of FIGS. 4B-4C, a "video stream time difference" of 25 seconds is provided. In the example of FIG. 4A, a "video stream time difference" of substantially zero (for example, less than 1 second, or less than half a second) is provided.

In one non-limiting use case, a parent may show the movie to a roomful of children, who view the movie on the big screen. The "look ahead" functionality allows the parent to "preview" the movie, and if the parent sees inappropriate content on the "small screen" to halt the playback on the "big screen" before the inappropriate content is displayed on the "big screen."

In one implementation, the "look-ahead' functionality is provided by control circuitry 120, either without requiring user input, or in accordance with input received via user control 144 (for example, including one or more buttons or keys or a dial or any other form factor).

Thus, in embodiments depicted in FIGS. 4B-4C, the first hardware media decoder 124 and the second hardware media decoder 128 are operative to simultaneously effect a playback of the given digital content item 148 in a manner such that the second media signal provides a look-ahead functionality relative to the first media signal.

Alternatively or additionally, in some embodiments, the first hardware media decoder 124 and the second hardware media decoder 128 may be operative to simultaneously effect a playback of the given digital content item 148 in a manner such that the second media signal provides a "look-back" functionality relative to the first media signal (not depicted in the figures). In the latter case, it may be said that the first media signal provides a "look-ahead" functionality relative to the second media signal.

Alternatively or additionally, the first hardware media decoder 124 and the second hardware media decoder 128 may simultaneously effect a playback of the given digital content item 148 in a manner that provides a "flexible time domain" (for example, X2, X4, Freeze image, replay) on the local screen 140A, without interrupting playback on the larger screen.

In some embodiments, the "synchronized playback" and/or "look ahead functionality" and/or "flexible time domain" is provided in a response to a coupling between portable media player device 100 and the external host presentation device 160.

Although "synchronized" playback, "look ahead functionality" and "flexible time domains" have been explained in terms of video playback, it is appreciated that one or more of these features may be provided for audio and/or multimedia playback.

Figure 5A:
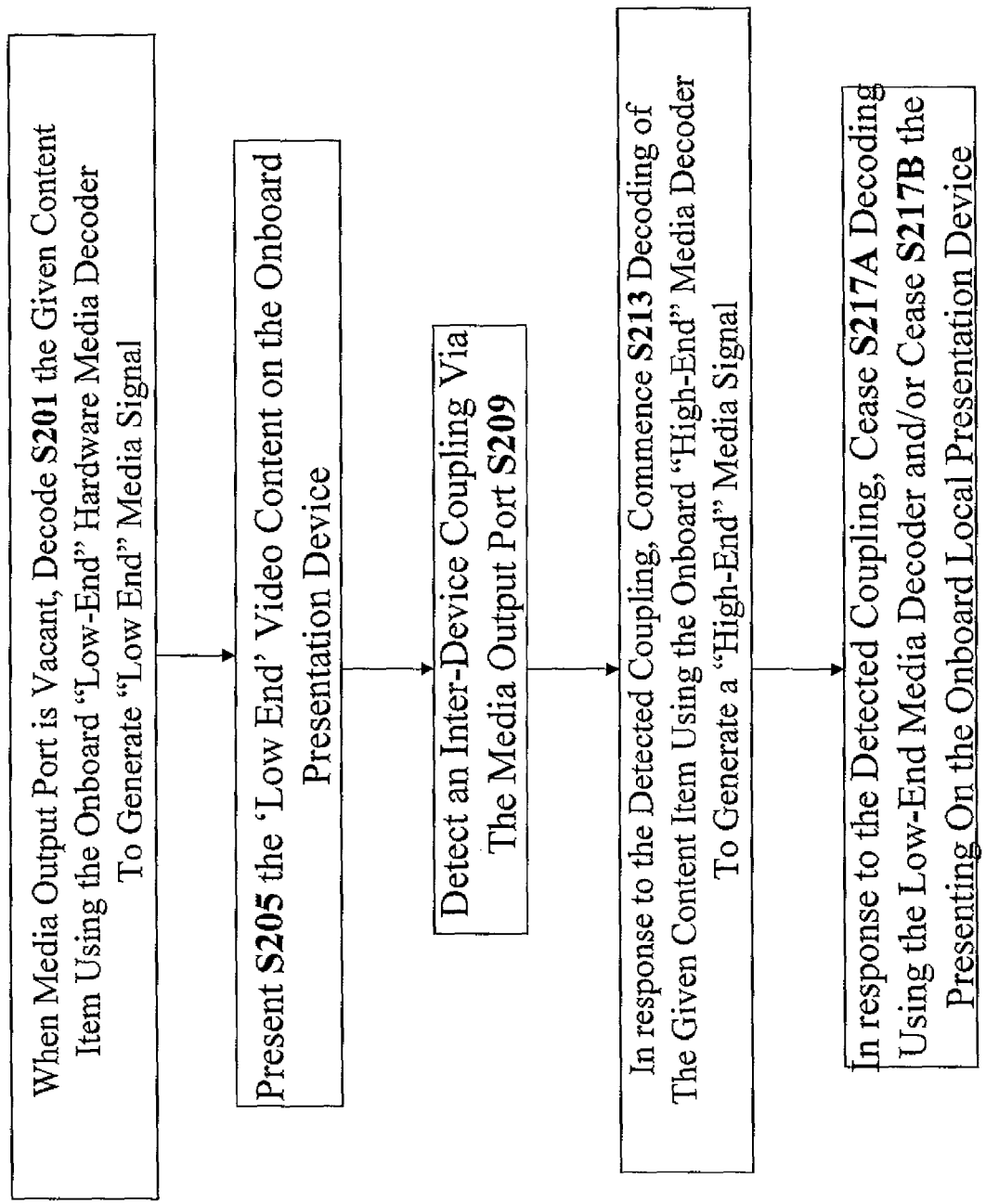
FIGS. 5A-5B are flow charts of routines for operating a portable media device in accordance with a detected coupling between the portable media device and an external host presentation device.
Figure 5B:
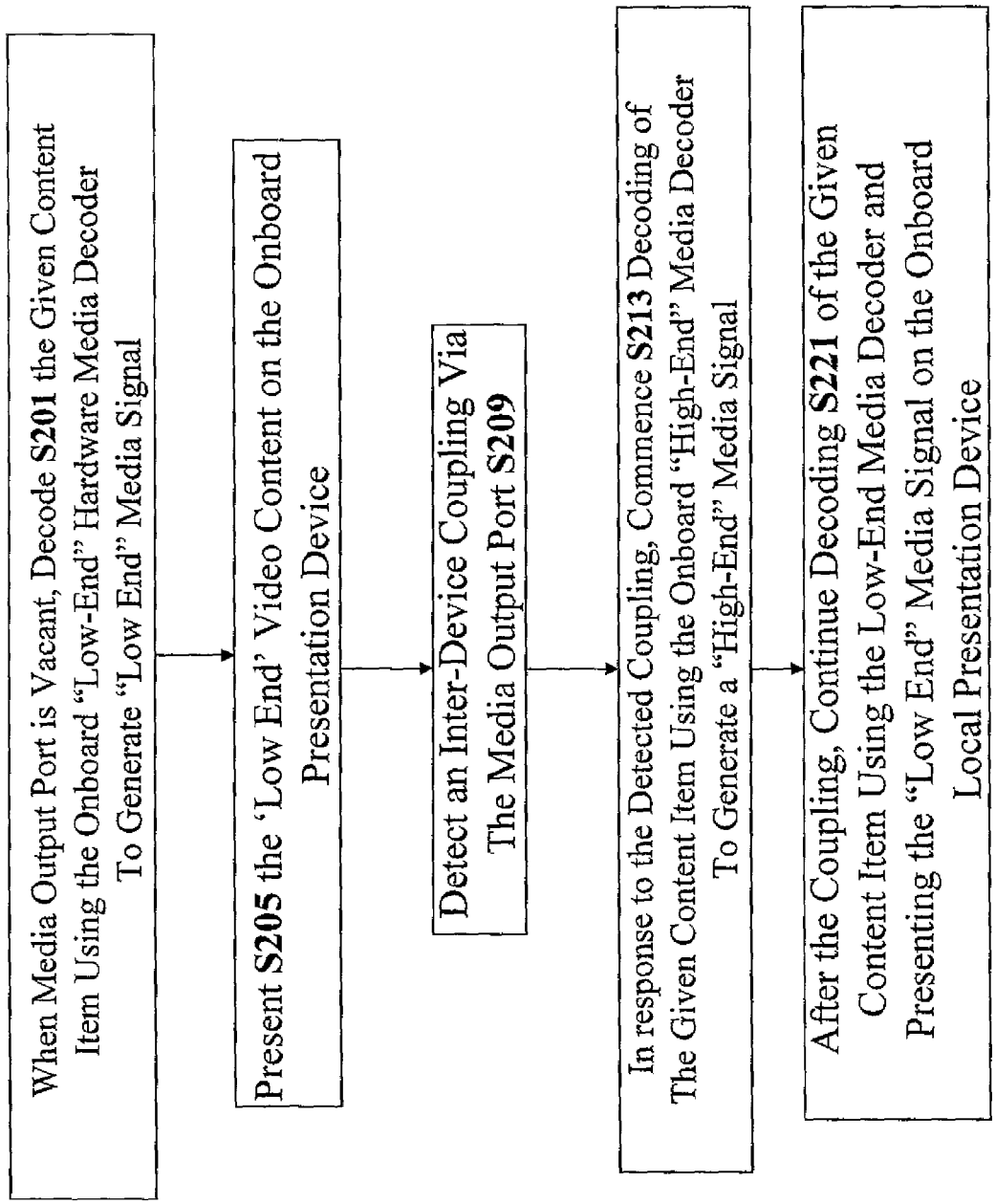

A Discussion of FIGS. 5A-5B

FIGS. 5A-5B are flow charts of routines for handling an inter-device coupling in accordance with some embodiments. Both FIGS. 5A and 5B include steps S201, S205, S209, and S213.

Figure 2B:
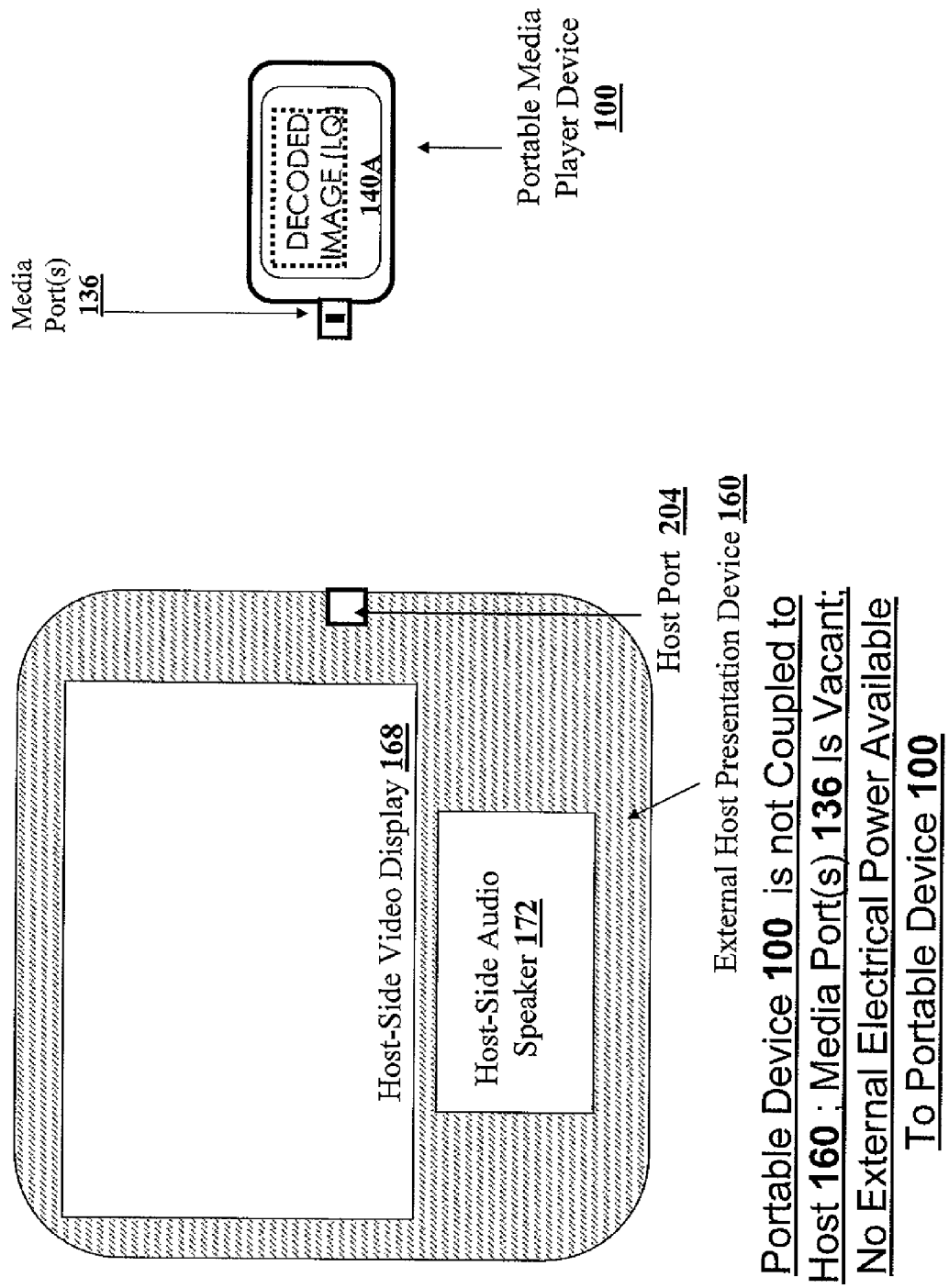
FIG. 2B is a drawing of an exemplary portable media device when not coupled to the external host presentation device.
Figure 2C:
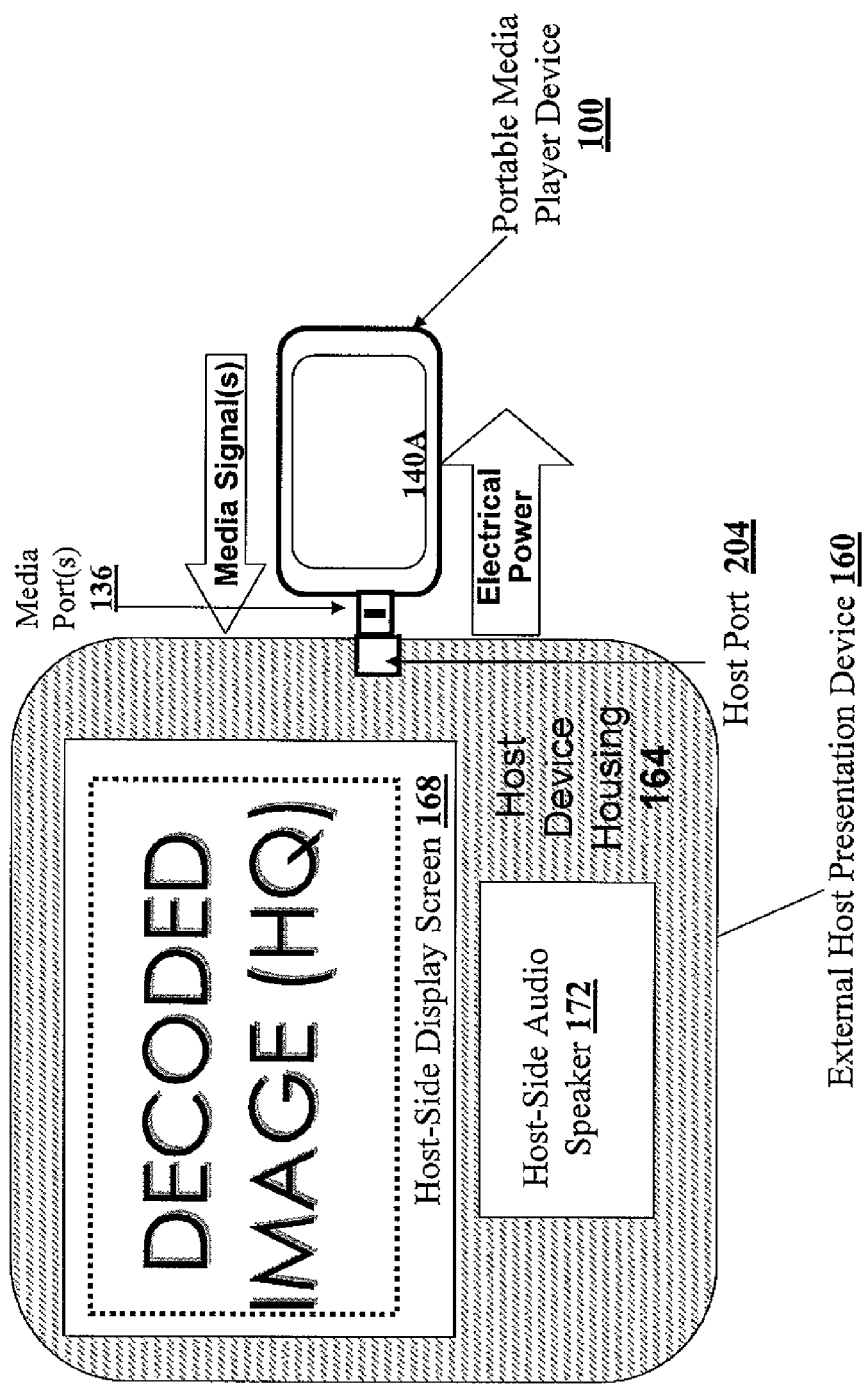
Figure 2D:
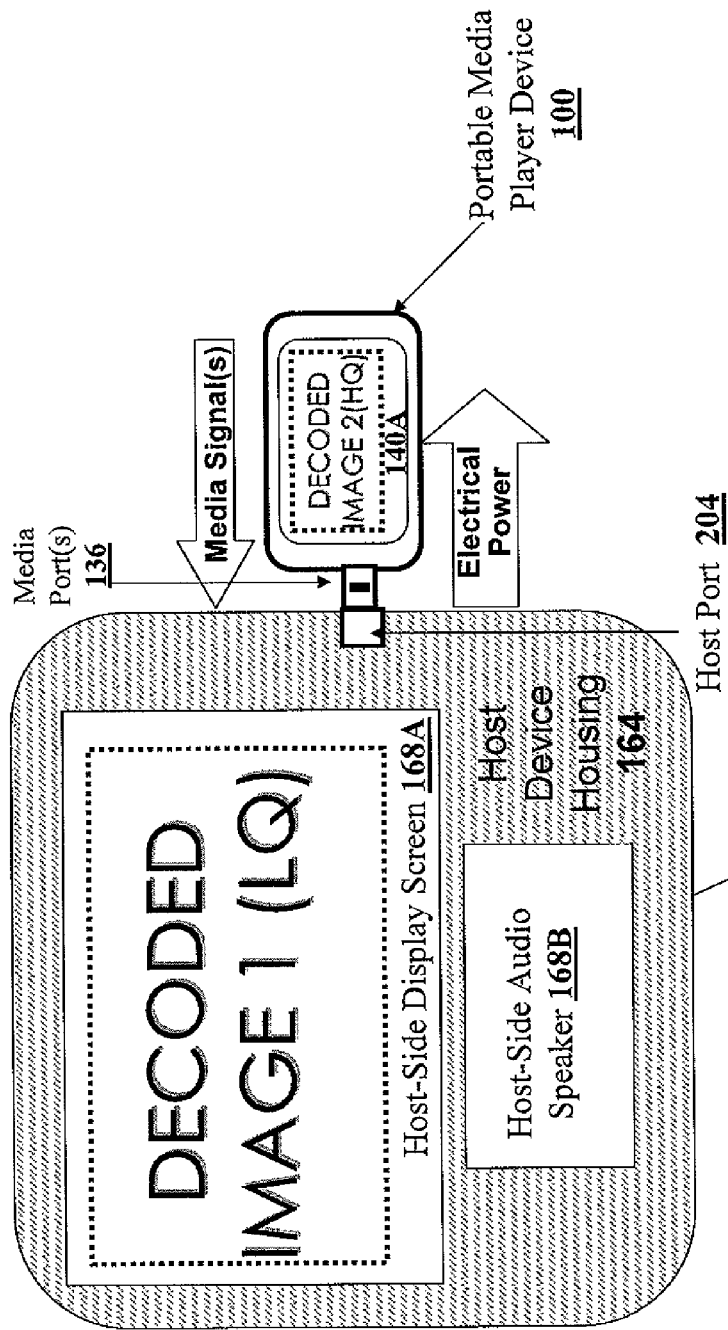

In step S201 of FIGS. 5A and 5B, when the media output port 136 is vacant, and the portable media device 100 is not coupled to the external host device 160, the given content item 148 is decoded by first onboard hardware media decoder 124 to generate the first media signals) which is presented (in step S205 of FIGS. 5A and 5B) on one or more of the onboard media presentation devices 140 (see, for example, FIG. 2B). In step S209 of FIGS. 5A and 5B, upon coupling between the portable media device 100 and the external host device 160 (for example, via portable media port 136 and host port 204), the inter-device coupling is detected, for example, by control circuitry 120.

In step S213 of FIGS. 5A and 5B, in response to the detected coupling, a decoding of content item 148 by the second onboard hardware media decoder 128 to generate the second media signal commences. This second media signal may be exported to the host presentation device 160 and presented by host presentation device 160.

In one example relating to movies and/or audio content, an indication of the first media decoder's 124 "media bookmark" of a "time location" within content item 148 is provided to second media decoder 128 (for example, by control circuitry 120). In this example, the decoding of content item 148 by the second onboard hardware media decoder 128 (which commences in step S213) is carried out in accordance with the "media bookmark" from the first media decoder. In one example, the playback in accordance with the bookmark of the first media decoder 124 is carried out so that the second media decoder 128 commences playback of media item 148 not at the beginning of media item, but at the "bookmark location," thereby allowing the user to "continue viewing" the same movie and/or "continue listening to" the same audio content item on the external device with minimal interruption. Alternatively, this may allow for a preview of the item.

It is noted that after coupling between the portable media device 100 and external host presentation device 160, either: (i) as illustrated in FIG. 2C or FIG. 2D, the decoding of the given content item 148 is halted or ceased by the first hardware media decoder in step S217A of FIG. 5B (or the decoding continues but the presenting on the local onboard presentation device 140 ceases in step S217B); or (ii) as illustrated in FIG. 2A, the decoding of the given content item 148 continues by first hardware media decoder 128 so that a simultaneous decoding of the content item 148 and simultaneous presenting of the decoded media is provided.

Figure 6A:
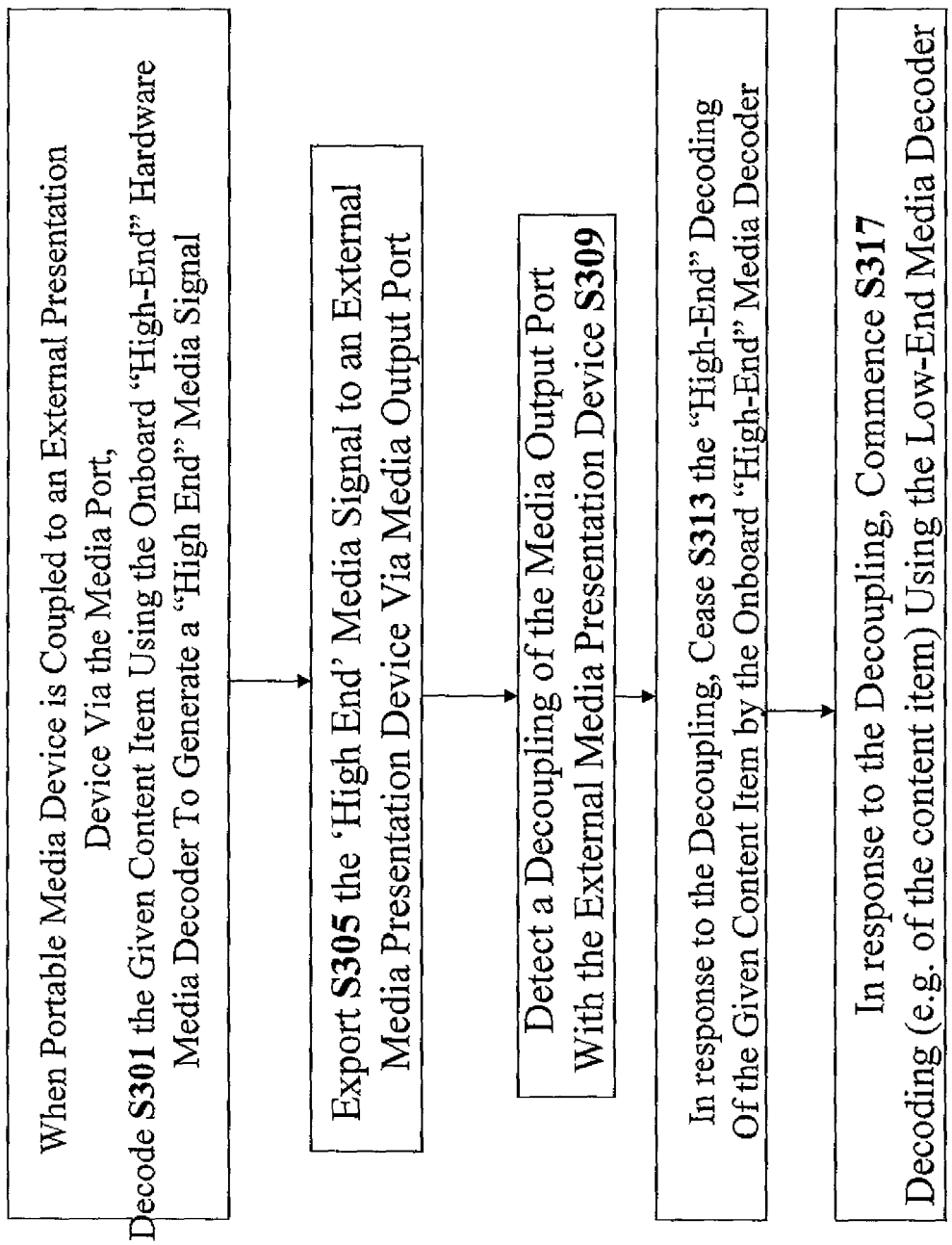
FIGS. 6A-6B are flow charts of routines for operating a portable media device in accordance with a detected decoupling of the portable media device from an external host presentation device.
Figure 6B:
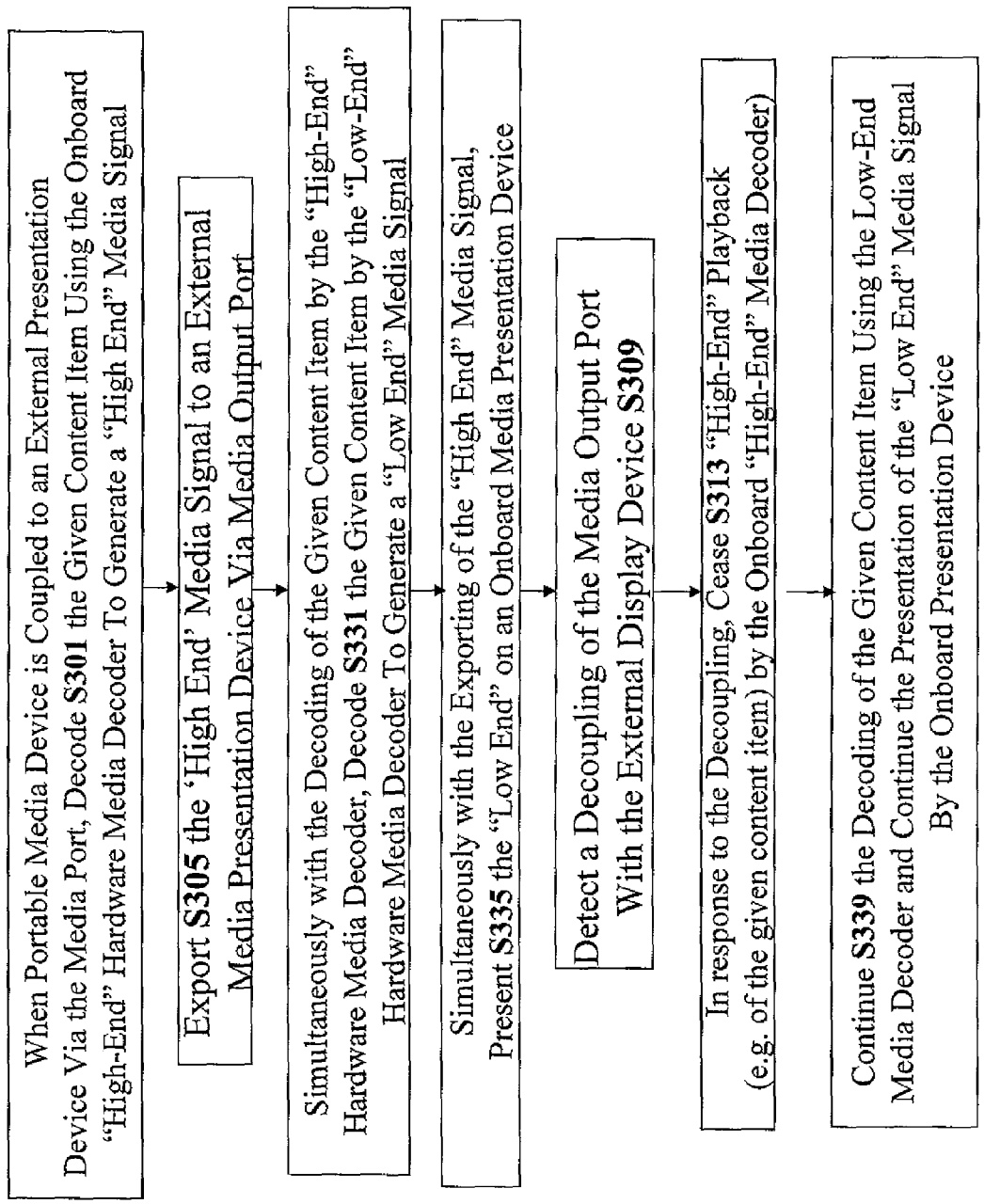

A Discussion of FIGS. 6A-6B

FIGS. 6A-6B are flow charts of routines for handling an inter-device decoupling in accordance with some embodiments. Both FIGS. 6A and 6B include steps S301, S305, S309, and S313.

FIG. 6A refers to the use case where, before the inter-device decoupling (i.e. at the time when the portable media device 100 is coupled to the external presentation device 160), only the second ("high-end") hardware media decoder decodes content item 148, and the first hardware media decoder is not decoding content item 148 (see for example, FIG. 2C).

FIG. 6B refers to the use case where, before the inter-device decoupling (i.e. at the time when the portable media device 100 is coupled to the external presentation device 160) a simultaneous decoding of the content item 148 is provided by both the first 124 and second 128 onboard hardware media decoders (see, for example, FIGS. 2A, 2C and 2D).

In step S301 of FIGS. 6A and 6B, when portable media device 100 is coupled to external presentation device 160 via media port 136, the given content item is decoded by decoder 128 to generate a 'high media signal.' This media signal is exported in step S305 of FIGS. 6A and 6B to the external presentation device 160 via media port 136 (see FIG. 2A or 2C or 2D).

In step S309 of FIGS. 6A and 6B, when the portable media device 100 is decoupled from the external host device 160 the inter-device decoupling is detected, for example, by control circuitry 120.

In step S313 of FIGS. 6A and 6B, in response to the detected decoupling, a decoding of the content item 148 by the second onboard hardware media decoder 128 ceases to "deactivate" second onboard hardware media decoder 128. This may be useful, for example to save power when external power is not available.

As noted above, FIGS. 6A and 6B refer to different use cases.

As for the use case of FIG. 6A, in step S317 of FIG. 6A, in response to the detected decoupling, the first hardware media decoder 128 commences the decoding of the given content item 148 to generate the "first" media signal which may be presented In one implementation of step S317, the decoding of content item 148 (for example, a movie or audio file) by the first "low end" media decoder 124 commences not from the beginning of the content item 148, but rather in accordance with a bookmark of the playback of the content item 148 used by the second "high end" media decoder 128. This may allow the user to view and/or listen to the content in a manner with minimal interruption—i.e. the 'low end" media decoder 124 may "pick up from the location where the high end media decoder 128 left off" upon decoupling.

As for the use case of FIG. 6B, it is noted that the routine of FIG. 6B provides several steps not provided in the routine of FIG. 6A.

Thus, in the example of FIG. 6B, it is noted that while portable media device 100 is still coupled to the external host presentation device 160 (i.e. before the decoupling event): (i) simultaneous with the decoding of content item 148 by the second "high end" hardware media decoder 128, the first "low end" hardware media decoder 124 decodes content item 148 to generate the first media signal(s) (150 and/or 152) in step S331; and (ii) simultaneous with the exporting of the "high end" media signal (154 and/or 156) of step S305, the "low end" media signal(s) (150 and/or 152) is presented, in step S335, on an onboard media presentation device 140.

In the example of FIG. 6B, after the decoupling between portable media device 100 and external host presentation device 160, in step S339, the decoding by the "low end" decoder (see step S331) and the presenting of the 'low end" media signal(s) (see step S335) continue.

Figure 7A:
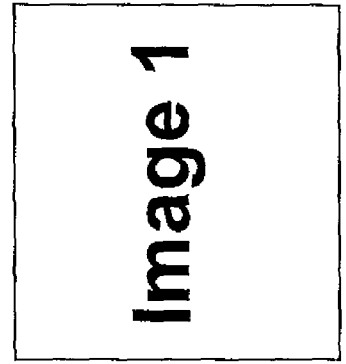
FIG. 7A is a diagram of an ordered sequence of images.
Figure 7A:
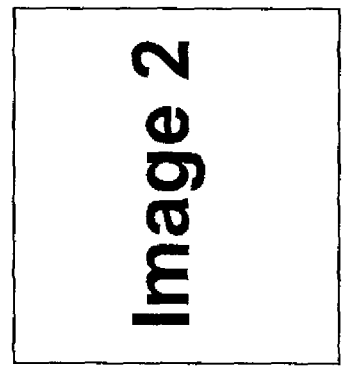
Figure 7A:
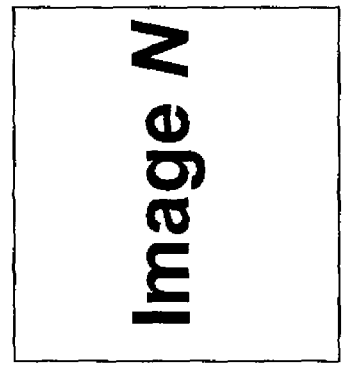

A Discussion of FIG. 7A

In some embodiments, portable media device 100 is useful for displaying an ordered sequence of images. In one example, the portable media device 100 is useful for showing an ordered sequence of slides (for example, of a Powerpoint® presentation).

Figure 7B:
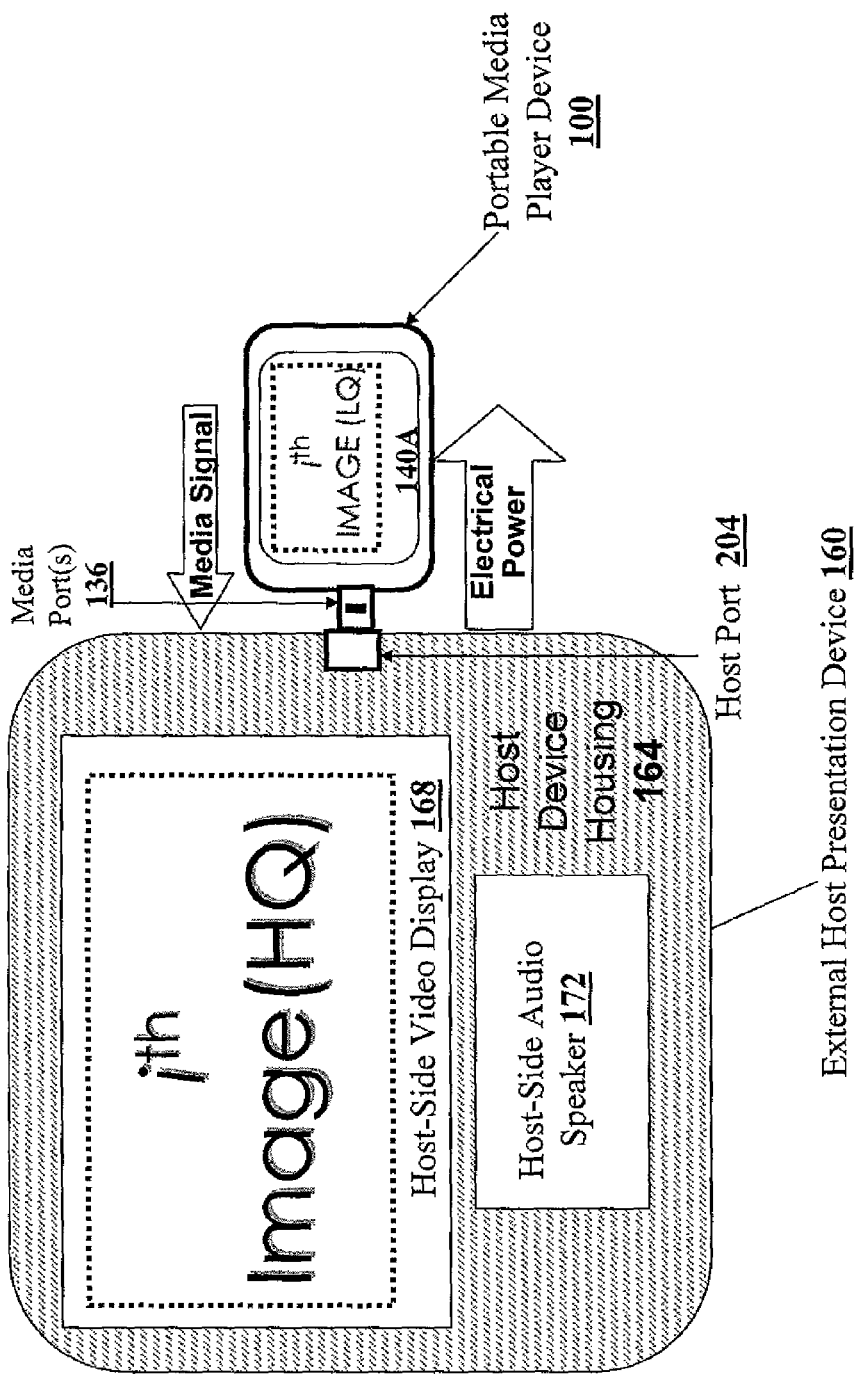
FIGS. 7B-7C illustrate the simultaneous presentation of images of an ordered sequence of images both on the onboard display screen and on a display screen of an external host presentation device.

FIG. 7A illustrates an ordered sequence of images. In the example of FIG. 7B, the sequence of images (for example, the slide show) is viewed so that identical slides in the slide sequence are displayed simultaneously on onboard screen 140A (which receives a video signal 150 from first hardware media decoder 124) and external presentation device 160 (which receives a video signal 154 from second hardware media decoder 128 via media port 136).

In some embodiments, the image displayed is a 'static image'—i.e. not an image of a 'movie.'

Figure 7C:
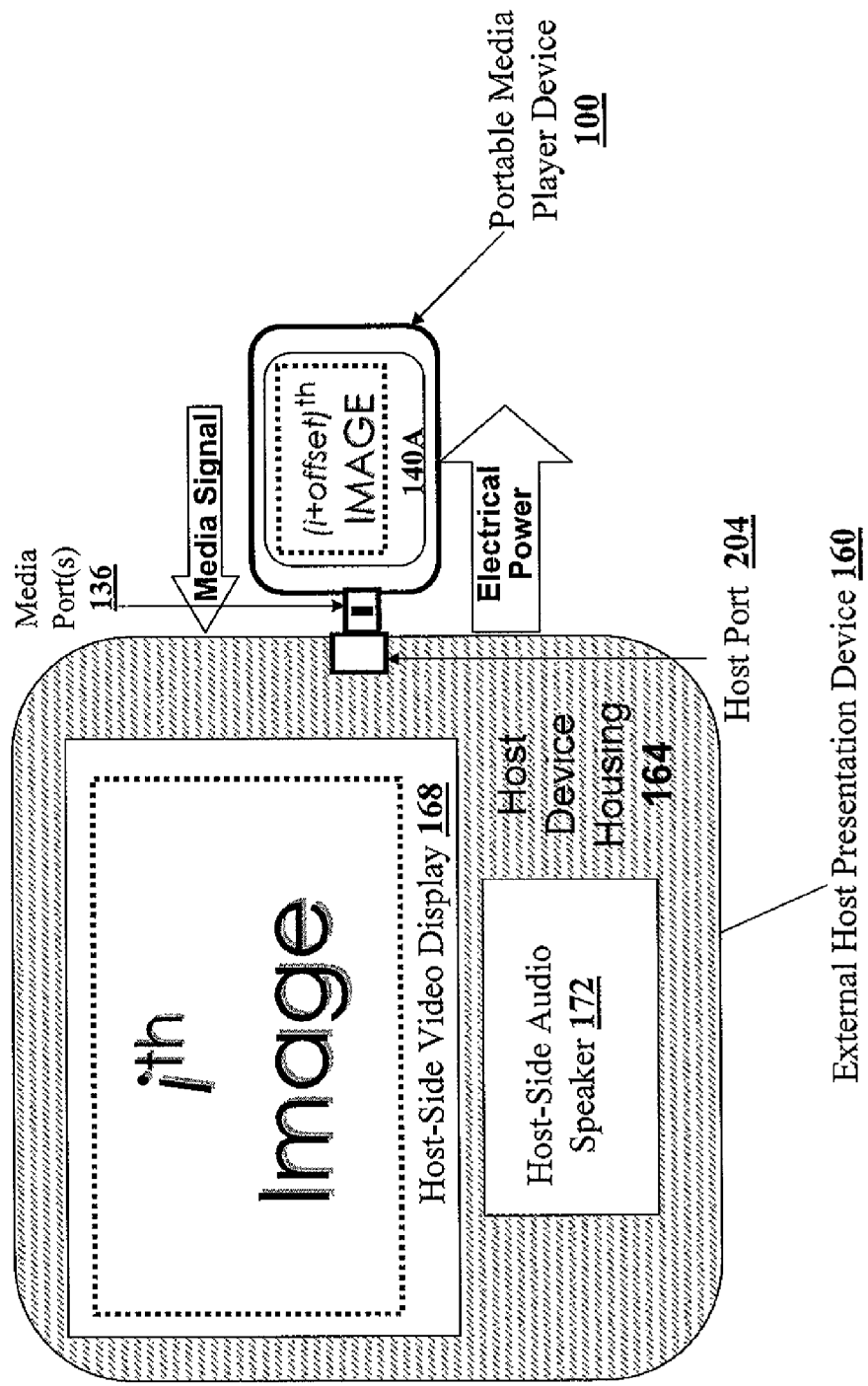

In the example of FIG. 7C, a "slide look ahead functionality" is provided so that a "later slide" in the sequence is displayed on onboard screen 140A while an "earlier slide" displayed simultaneously on the external presentation device 160.

This may allow a presented to preview the next slide, while presenting the current slide on the external presentation device 160.

Additional Comments About FIG. 1

As shown in FIG. 1, portable media device 100 includes onboard display screen 140A. In some embodiments, portable media device 100 may include exactly on onboard display screen 140A. Furthermore, it is noted that in some embodiments, portable media device 100 lacks onboard display screen 140A and/or onboard speaker 140B. For example, 'low end' video signal 150 and/or 'low end' audio signal 152 may be exported via one or more media port(s).

Although given digital media content item 148 was illustrated in FIG. 1 as residing in onboard storage 116, this is not a limitation. In some embodiments, given digital media content item 148 resides in an external storage (NOT SHOWN—for example, a USB device or a memory card such as an MMC or SD card) coupled to portable media player via external storage port 112. The external storage may be simultaneously accessible by both first 124 and second 128 onboard media decoders.

Media port(s) 136 may include any appropriate analog and/or digital media port (e.g. plug or socket). Exemplary media ports include but are not limited to HDMI (High Definition Multi-media interface) plugs, S-video plugs, VGA (Video Graphics Array) ports, audio sockets, and banana cables.

Different embodiments of the present invention (for example, with reference to FIGS. 3A-3B, 5A-5B, 6A-6B) where one or more hardware media decoder (124 and/or 128) is activated or deactivated 'automatically' in response to a detected event (for example, a coupling or decoupling with external host device 160). In some embodiments, user control 144 is configured to allow the user to 'manually' activate and/or deactivate a hardware media decoder (124 or 128) and/or to switch between 'modes' where only one of the two hardware media decoders is active and/or where both of the two hardware media decoders are active.

A Brief Discussion of Relative Video Quality

As noted earlier, the terms "low end" and "high end" are intended as relative terms, and refer to the relative quality of the media signal(s) generated by the first and second onboard media player.

In one non-limiting example, the "high quality" video has a high definition resolution images of 1320×720 pixels, and a high color quality (for example, 8 bits per color and three colors).

In different embodiments, the "relative quality" of video of generated by the first hardware media decoder 124 (in this case a video decoder) and the second hardware media decoder 128 may be characterized by one of more of: (i) total number of pixels of the images produced by the decoder and/or (ii) color depth of the images produce by the decoder and/or (iii) frame refresh rate (property (iii) is limited to streaming video decoders).

In one example related to property (i), the first 124 hardware media decoder is a hardware video decoder that is operative such that the first media signal is a first video signal, the second 128 hardware media decoder is a hardware video decoder that is operative such that the second media signal is a second video signal, and a ratio between a total number of pixels of images of the first video signal and a total number of pixels of images of the second video signal is at most 1/3.

In one example related to property (ii the first 124 hardware media decoder is a hardware video decoder that is operative such that the first media signal is a first video signal, the second 128 hardware media decoder is a hardware video decoder that is operative such that the second media signal is a second video signal, and a ratio between a color depth of the first video signal and a color depth of the second video signal is at least 1.5. In one example related to property (iii), the first 124 hardware media decoder is a hardware streaming video decoder that is operative such that the first media signal is a first video stream, the second 128 hardware media decoder is a hardware streaming video decoder that is operative such that the second media signal is a second video stream, and a ratio between a frame refresh rate of the first video stream and a refresh rate of the second video stream is at most 1/2.

As noted earlier, in some embodiments a user control 144 is provided, for example, for controlling a video stream time difference and/or for effecting mode transitions between modes where one or both decoders are active (or dormant) and/or for any other purpose. In some embodiments, user control 144 is mechanically integrated with device housing 104.

Concluding Remarks

It is further noted that any of the embodiments described above may further include receiving, sending or storing instructions and/or data that implement the operations described above in conjunction with the figures upon a computer readable medium. Generally speaking, a computer readable medium may include storage media or memory media such as magnetic or flash or optical media, e.g. disk or CD-ROM, volatile or non-volatile media such as RAM, ROM, etc. as well as transmission media or signals such as electrical, electromagnetic or digital signals conveyed via a communication medium such as network and/or wireless links.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A portable media device for decoding a given digital content item, the media device comprising:
   a device housing;
   a first onboard hardware media decoder associated with the device housing, the first onboard hardware media decoder operative to decode the given digital content item to generate a first media signal;
   a second onboard hardware media decoder associated with the device housing, the second onboard hardware media decoder operative to decode the given digital content item to generate a second media signal; and
   a media output port mechanically integrated with the device housing for exporting at least one of the generated media signals, wherein, in response to the portable media device being connected to an external host presentation device, the second onboard hardware media decoder is configured to decode the digital content item and generate the second media signal and the media output port is configured to output the second media signal and, in response to the portable media device not being connected to an external host presentation device, the second onboard hardware media decoder is configured to transition to a dormant state so that the second media decoding is not effected and the first onboard hardware media decoder is configured to effect the first media decoding using an onboard power supply to generate the first media signal.

2. The portable media device of claim 1 further comprising:
   exactly one onboard display screen mechanically integrated with the device housing for displaying the first media signal, wherein:

the onboard display screen is operatively coupled to the first onboard hardware media decoder without being operatively coupled to the second onboard hardware media decoder; and the media output port is operatively coupled to the second onboard hardware media decoder to export the second media signal; and the first onboard hardware media decoder is configured within the portable media device such that no output media signal from the first onboard hardware media decoder may be exported from the portable media device to any external device.

3. The portable media device of claim 1 wherein a ratio between a power consumption of the second hardware media decoder and a power consumption of the first hardware media decoder is at least 2.

4. The portable media device of claim 3 further comprising: the onboard power source for powering the first hardware media decoder wherein:

the media output port is a multi-function port that is also operative for receiving electrical power; and operation of the second hardware media decoder is contingent upon an availability of external power via the media output port.

5. The portable media device of claim 1 wherein:

the first hardware media decoder is a hardware video decoder that is operative such that the first media signal is a first video signal;

the second hardware media decoder is a hardware video decoder that is operative such that the second media signal is a second video signal; and the first and second hardware media decoders are configured such that at least one video quality relation selected from the group consisting of a first video quality relation and a second video quality relation is true; and the first and second video quality relations are defined as follows:

according to the first video quality relation, a ratio between a total number of pixels of a video image of the first video signal and a total number of pixels of a video image of the second video signal is at most 1/3; and according to the second video quality relation a ratio between a color depth of a video image of the first video signal and a color depth of video image of the second video signal is at least 1.5.

6. The portable media device of claim 1 wherein:

the first hardware media decoder is a hardware streaming video decoder that is operative such that the first media signal is a first video stream;

the second hardware media decoder is a hardware streaming video decoder that is operative such that the second media signal is a second video stream; and a ratio between a frame refresh rate of the first video stream and a refresh rate of the second video stream is at most 1/2.

7. The portable media device of claim 1 wherein:

the first and second hardware media decoders are operative so that at least one operation condition selected from the group consisting of a first operation condition is true and a second operation condition is true; and the first and second operations condition are defined as follows:

according to the first operation condition, the first and second hardware media decoders are operative to respectively generate the first and second media signals from the given digital media content item simultaneously; and according to the second operation condition, one of the first and second hardware media decoders is operative to effect a respective decoding at a time when the other of the first and second hardware media decoder is dormant.

8. The portable media device of claim 1 wherein:

the first and second hardware media decoders are operative so that at least one operation condition selected from the group consisting of a first operation condition is true and a second operation condition is true; and the first and second operations condition are defined as follows:

according to the first operation condition, at least one of the first media signal and the second media signal is a static video signal; and according to the second operation condition, each of the first hardware media decoder and the second hardware media decoder is a hardware streaming media decoder.

9. The portable media device of claim 1 wherein:

the first hardware media decoder is a hardware streaming video decoder that is operative such that the first media signal is a first video stream;

the second hardware media decoder is a hardware streaming video decoder that is operative such that the second media signal is a second video stream; and the first hardware media decoder and the second hardware media decoder are configured to effect the respective decodings so that the first and second video streams are synchronized playback streams of the given content item.

10. The portable media device of claim 1 wherein:

the first hardware media decoder is a hardware streaming video decoder that is operative such that the first media signal is a first video stream;

the second hardware media decoder is a hardware streaming video decoder that is operative such that the second media signal is a second video stream; and the device further comprises:

a user control for controlling a video stream time difference between the first and second playbacks.

11. The portable media device of claim 1 wherein:

the device further comprises:

an onboard media presentation device mechanically integrated with the device housing; and the second hardware media decoder and the media output port are configured within the portable media device to respond to an inter-device coupling via the media port that occurs at a time when:

the first hardware media decoder is decoding the given digital media content item to generate the first media signal from the digital media content item, and the onboard display presentation device is presenting the first media signal, by:

commencing the decoding of the given digital media content item by the second hardware media decoder to generate the second media signal; and commencing the exporting via the media output port of the second media signal.

12. The portable media device of claim 11 wherein the first hardware media decoder and the onboard media presentation device are configured within the portable media device to respond to the inter-device coupling by ceasing at least one of:

the decoding of the digital content item by the first hardware media decoder; and the presenting of the first media signal by the onboard media presentation device.

13. A portable media device comprising:
a device housing;
a first onboard hardware media decoder associated with the device housing, the first onboard hardware media decoder operative to decode the given digital content item to generate a first media signal;
a second onboard hardware media decoder associated with the device housing, the second onboard hardware media decoder operative to decode the given digital content item to generate a second media signal;
a media output port mechanically integrated with the device housing for exporting at least one of the generated media signals;
an onboard media presentation device mechanically integrated with the device housing; and
the second hardware media decoder and the media output port are configured within the portable media device to respond to an inter-device coupling via the media port that occurs at a time when:
the first hardware media decoder is decoding the given digital media content item to generate the first media signal from the digital media content item, and
the onboard display presentation device is presenting the first media signal, by:
commencing the decoding of the given digital media content item by the second hardware media decoder to generate the second media signal; and
commencing the exporting via the media output port of the second media signal;
wherein the first hardware media decoder and the onboard media presentation device are configured within the portable media device to continue:
the decoding of the digital content item by the first hardware media decoder; and
the presenting of the first media signal by the onboard media presentation device after the commencing of the decoding of the given digital content item by the second hardware media decoder which occurs after the inter-device coupling.

14. A portable media device comprising:
a device housing;
a first onboard hardware media decoder associated with the device housing, the first onboard hardware media decoder operative to decode the given digital content item to generate a first media signal;
a second onboard hardware media decoder associated with the device housing, the second onboard hardware media decoder operative to decode the given digital content item to generate a second media signal;
a media output port mechanically integrated with the device housing for exporting at least one of the generated media signals;
an onboard media presentation device mechanically integrated with the device housing; and
the second hardware media decoder and the media output port are configured within the portable media device to respond to an inter-device coupling via the media port that occurs at a time when:
the first hardware media decoder is decoding the given digital media content item to generate the first media signal from the digital media content item, and
the onboard display presentation device is presenting the first media signal, by:
commencing the decoding of the given digital media content item by the second hardware media decoder to generate the second media signal;
commencing the exporting via the media output port of the second media signal; and
wherein the second hardware media decoder is operative to commence the decoding of the given content item in accordance with a streaming media playback bookmark of the first hardware media decoder.

15. A portable media device for decoding a given digital content item, the media device comprising:
a device housing;
a first onboard hardware media decoder associated with the device housing, the first onboard hardware media decoder operative to decode the given digital content item to generate a first media signal;
a second onboard hardware media decoder associated with the device housing, the second onboard hardware media decoder operative to decode the given digital content item to generate a second media signal;
a media output port mechanically integrated with the device housing for exporting at least one of the generated media signals; and
wherein the first hardware media decoder and the second hardware media decoder are operative to simultaneously effect a playback of the given digital content item in a manner such that the second media signal provides at least one of:
a look-ahead functionality relative to the first media signal;
a look-back functionality relative to the first media signal; and
a flexible time domain relative to the first media signal.

16. A portable media device for decoding a given digital content item, the media device comprising:
a device housing;
a first onboard hardware media decoder associated with the device housing, the first onboard hardware media decoder operative to decode the given digital content item to generate a first media signal;
a second onboard hardware media decoder associated with the device housing, the second onboard hardware media decoder operative to decode the given digital content item to generate a second media signal;
a media output port mechanically integrated with the device housing for exporting at least one of the generated media signals;
the portable media device further comprises:
a media presentation device mechanically integrated with the device housing; and
the first hardware media decoder, the onboard media presentation device, the second hardware media decoder and the media output port are configured within the portable media device to respond to an inter-device decoupling via the media port that occurs at a time when:
by:
the second hardware media decoder is decoding the given digital media content item to generate the second media signal from the digital media content item; and
the media output port is exporting the second media signal,
ceasing the decoding of the digital media content item by the second hardware media decoder; and
commencing the decoding of the digital media content item by the first hardware media decoder to generate the first media signal and the presenting of the first media signal on the onboard display screen.

17. A portable media device for decoding a given digital content item, the media device comprising:
a device housing;
a first onboard hardware media decoder associated with the device housing, the first onboard hardware media decoder operative to decode the given digital content item to generate a first media signal;
a second onboard hardware media decoder associated with the device housing, the second onboard hardware media decoder operative to decode the given digital content item to generate a second media signal;
a media output port mechanically integrated with the device housing for exporting at least one of the generated media signals;
the portable media device further comprises:
an onboard display screen mechanically integrated with the device housing; and
the first hardware media decoder, the onboard display screen, the second hardware media decoder and the media output port are configured within the portable media device to respond to an inter-device decoupling via the media port that occurs at a time when: by:
the second hardware media decoder is decoding the given digital media content item to generate the second media signal from the digital media content item;
the media output port is exporting the second media signal,
the first hardware media decoder is decoding the given digital media content item to generate the first media signal from the digital media content item; and
the onboard display screen is presenting the first media signal,
ceasing the second digital media playback of the digital media content item by the second hardware media decoder; and
continuing the first digital media playback of the digital media content item by the first hardware media decoder to generate the first video stream and the presenting of the first media on the onboard display screen.

18. portable media device for decoding a given digital content item, the media device comprising:
a device housing;
a first onboard hardware media decoder associated with the device housing, the first onboard hardware media decoder operative to decode the given digital content item to generate a first media signal;
a second onboard hardware media decoder associated with the device housing, the second onboard hardware media decoder operative to decode the given digital content item to generate a second media signal;
a media output port mechanically integrated with the device housing for exporting at least one of the generated media signals;
the portable media device further comprises:
a user control for effecting a mode transition between any of a first mode, a second mode and a third mode; and
the first, second and third modes are defined as follows:
when in the first mode, the first hardware media decoder is active and the second hardware media decoder is dormant;
when in the second mode, the second hardware media decoder is active and the first hardware media decoder is dormant; and
when in the third mode, both of the first hardware media decoder is active and the second hardware media decoder are active.

19. A portable media device comprising:
a device housing;
a device port located within the device housing;
a first onboard hardware media decoder located within the device housing;
a second onboard hardware media decoder located within the device housing;
control circuitry located within the device housing and operative to:
determine whether the device port is connected to an external media presentation device;
in response to determining that the device port is connected to the external media presentation device, activating the second onboard hardware media decoder to effect first media decoding of a given digital content item to generate a first media signal and output the first media signal to the external media presentation device via the device port; and
in response to determining that the device port is not connected to the external media presentation device, activating the first onboard hardware media decoder without activating the second onboard hardware media decoder such that the second onboard hardware media decoder transitions to a dormant state so that the first media decoding is not effected and the first onboard hardware media decoder is configured to effect second media decoding of a given digital content item using an onboard power supply to generate a second media signal.

20. The portable media device of claim 19 wherein a ratio between a power consumption of the second hardware media decoder and a power consumption of the first hardware media decoder is at least 2.

21. The portable media device of claim 19 wherein:
the first hardware media decoder is a hardware streaming video decoder that is operative to generate a first video stream;
the second hardware media decoder is a hardware streaming video decoder that is operative to generate a first video stream; and
the first and second hardware media decoders are configured such that at least one video quality relation selected from the group consisting of a first video quality relation, a second video quality relation and a third video quality relation is true; and
the first, second and third video quality relations are defined as follows:
according to the first video quality relation, a ratio between a total number of pixels of a video image of the first video stream and a total number of pixels of a video image of the second video stream is at most 1/3;
according to the second video quality relation, a ratio between a frame refresh rate of the first video stream and a refresh rate of the second video stream is at most 1/2; and
according to the third video quality relation, a ratio between a color depth of the first video stream and a color depth of the second video stream is at least 1.5.

* * * * *